US012800889B2

(12) United States Patent
Ohtake

(10) Patent No.: US 12,800,889 B2
(45) Date of Patent: Nov. 17, 2026

(54) ZOOM OPTICAL SYSTEM, OPTICAL APPARATUS AND METHOD FOR MANUFACTURING THE ZOOM OPTICAL SYSTEM

(71) Applicant: Nikon Corporation, Tokyo (JP)

(72) Inventor: Fumiaki Ohtake, Tokyo (JP)

(73) Assignee: Nikon Corporation, Tokyo (JP)

( * ) Notice: Subject to any disclaimer, the term of this patent is extended or adjusted under 35 U.S.C. 154(b) by 263 days.

(21) Appl. No.: 18/266,594

(22) PCT Filed: Nov. 4, 2021

(86) PCT No.: PCT/JP2021/040485

§ 371 (c)(1),
(2) Date: Jun. 11, 2023

(87) PCT Pub. No.: WO2022/137820

PCT Pub. Date: Jun. 30, 2022

(65) Prior Publication Data

US 2024/0201475 A1 Jun. 20, 2024

(30) Foreign Application Priority Data

Dec. 22, 2020 (JP) ................................ 2020-211906

(51) Int. Cl.
*G02B 15/14* (2006.01)

(52) U.S. Cl.
CPC ................ *G02B 15/143103* (2019.08); *G02B 15/144107* (2019.08)

(58) Field of Classification Search
CPC ................ G02B 15/144107; G02B 15/143103
(Continued)

(56) References Cited

U.S. PATENT DOCUMENTS 5,144,489 A * 9/1992 Shibayama ........ G02B 15/1421 359/689
5,363,243 A 11/1994 Takayuki et al.
(Continued)

FOREIGN PATENT DOCUMENTS

CN 107076968 A 8/2017
CN 109844603 A 6/2019
(Continued)

OTHER PUBLICATIONS

International Search Report from International Patent Application No. PCT/JP2021/040485, Feb. 1, 2022.
(Continued)

*Primary Examiner* — Priyank J Shah
(74) *Attorney, Agent, or Firm* — Potomac Law Group, PLLC

(57) ABSTRACT

A variable-magnification optical system (ZL) comprises: a first lens group (G1) having a positive refractive power; and a rear group (GR) including a plurality of lens groups. When changing the magnification, the gap between each adjacent pair of lens groups changes. The plurality of lens groups in the rear group (GR) include a second lens group (G2) having a positive refractive power and disposed nearest to the object side in the rear group (GR). The variable-magnification optical system (ZL) satisfies the following conditional expression: 0.15<f2/f1<0.80, where f1 is the focal length of the first lens group (G1), and f2 is the focal length of the second lens group (G2).

20 Claims, 11 Drawing Sheets

(58) Field of Classification Search
USPC .................................................. 359/689, 683
See application file for complete search history.

(56) References Cited

U.S. PATENT DOCUMENTS

| | | | | |
|---|---|---|---|---|
| 5,654,829 | A | 8/1997 | Ohtake | |
| 6,064,531 | A | 5/2000 | Ishii et al. | |
| 6,307,684 | B1 | 10/2001 | Iyama | |
| 2009/0153980 | A1 * | 6/2009 | Yamamoto ........... | G02B 27/646 359/689 |
| 2013/0235468 | A1 * | 9/2013 | Yanai ................... | G02B 15/173 359/687 |
| 2014/0247506 | A1 * | 9/2014 | Ori ......................... | G02B 13/18 359/708 |
| 2014/0254027 | A1 * | 9/2014 | Amano ................ | G02B 15/177 359/683 |
| 2015/0103412 | A1 * | 4/2015 | Ori ......................... | G02B 13/18 359/689 |
| 2016/0018630 | A1 * | 1/2016 | Ori ......................... | G02B 15/20 359/557 |
| 2016/0091697 | A1 * | 3/2016 | Ikeda ................... | G02B 15/173 359/683 |
| 2017/0176725 | A1 | 6/2017 | Machida | |
| 2020/0257096 | A1 | 8/2020 | Ito | |
| 2021/0109330 | A1 * | 4/2021 | Hori ..................... | G02B 15/173 |
| 2023/0101126 | A1 * | 3/2023 | Ohtake .......... | G02B 15/145511 359/683 |
| 2023/0273413 | A1 * | 8/2023 | Mochizuki ............. | G02B 13/02 359/683 |

FOREIGN PATENT DOCUMENTS

| | | | |
|---|---|---|---|
| JP | H0588085 | A | 4/1993 |
| JP | H08-043735 | A | 2/1996 |
| JP | H08179215 | A | 7/1996 |
| JP | H08211289 | A | 8/1996 |
| JP | H10221601 | A | 8/1998 |
| JP | H11223771 | A | 8/1999 |
| JP | H11326764 | A | 11/1999 |
| JP | 2002-258158 | A | 9/2002 |
| JP | 2002365551 | A | 12/2002 |
| JP | 2018132675 | A | 8/2018 |

OTHER PUBLICATIONS

International Preliminary Report on Patentability for International Patent Application No. PCT/JP2021/040485, Jul. 6, 2023.
Office Action issued May 7, 2024, in Japanese Patent Application No. 2022-571932.
Office Action issued Sep. 10, 2024, in Japanese Patent Application No. 2022-571932.
Office Action issued May 7, 2025, in Japanese Patent Application No. 2024-205082.
Office Action issued Feb. 12, 2026, in Chinese Patent Application No. 202180084625.9.
Office Action issued Aug. 14, 2026, in Chinese Patent Application No. 202180084625.9.

* cited by examiner

ZOOM OPTICAL SYSTEM, OPTICAL APPARATUS AND METHOD FOR MANUFACTURING THE ZOOM OPTICAL SYSTEM

TECHNICAL FIELD

The present invention relates to a zoom optical system, an optical apparatus, and a method for manufacturing the zoom optical system.

TECHNICAL BACKGROUND

Conventionally, a zoom optical system that is suitable for a photographing camera, an electronic still camera, a video camera, and the like has been proposed (for example, refer to Patent literature 1). With such a zoom optical system, it is difficult to achieve bright and favorable optical performance with a small size.

PRIOR ARTS LIST

Patent Document

Patent literature 1: Japanese Laid-Open Patent Publication No. 2018-132675 (A)

SUMMARY OF THE INVENTION

A zoom optical system according to a first invention consists of a first lens group having positive refractive power and a rear group comprising a plurality of lens groups, the lens groups being arranged in order from an object side along an optical axis, a space between the lens groups adjacent to each other changes upon zooming, the plurality of lens groups in the rear group include a second lens group having positive refractive power and disposed closest to the object side in the rear group, and the following conditional expression is satisfied, $$0.15<f2/f1<0.80$$

where, f1: a focal length of the first lens group, and f2: a focal length of the second lens group.

A zoom optical system according to a second invention consists of a first lens group having positive refractive power and a rear group comprising a plurality of lens groups, the lens groups being arranged in order from an object side along an optical axis, upon zooming from a wide-angle end state to a telephoto end state, the first lens group moves to the object side along the optical axis and the space between the lens groups adjacent to each other changes, the first lens group comprises a front fixed group having a position fixed relative to an image surface upon focusing and a front focusing group that moves along the optical axis upon focusing, the groups being arranged in order from the object side along the optical axis, and the following conditional expressions are satisfied, $$0.60<fP1/(-fF1)<1.00$$

$$0.80<(-fF1)/fw<1.40$$

where, fP1: a focal length of the front fixed group, fF1: a focal length of the front focusing group, and fw: a focal length of the zoom optical system in the wide-angle end state.

An optical apparatus according to the present invention comprises the above-described zoom optical system.

A first method for manufacturing a zoom optical system consisting of a first lens group having positive refractive power and a rear group comprising a plurality of lens groups, the lens groups being arranged in order from an object side along an optical axis, the method comprises a step for arranging the lens groups in a lens barrel so that;

a space between the lens groups adjacent to each other changes upon zooming, the plurality of lens groups in the rear group include a second lens group having positive refractive power and disposed closest to the object side in the rear group, and the following conditional expression is satisfied, $$0.15<f2/f1<0.80$$

where, f1: a focal length of the first lens group, and f2: a focal length of the second lens group.

A second method for manufacturing a zoom optical system consisting of a first lens group having positive refractive power and a rear group comprising a plurality of lens groups, the lens groups being arranged in order from an object side along an optical axis, the method comprises a step for arranging the lens groups in a lens barrel so that;

upon zooming from a wide-angle end state to a telephoto end state, the first lens group moves to the object side along the optical axis and a space between the lens groups adjacent to each other changes, the first lens group comprises a front fixed group having a position fixed relative to an image surface upon focusing and a front focusing group that moves along the optical axis upon focusing, the groups being arranged in order from the object side along the optical axis, and the following conditional expressions are satisfied, $$0.60<fP1/(-fF1)<1.00$$

$$0.80<(-fF1)/fw<1.40$$

where, fP1: a focal length of the front fixed group, fF1: a focal length of the front focusing group, and fw: a focal length of the zoom optical system in the wide-angle end state.

DESCRIPTION OF THE EMBODIMENTS

Figure 9:
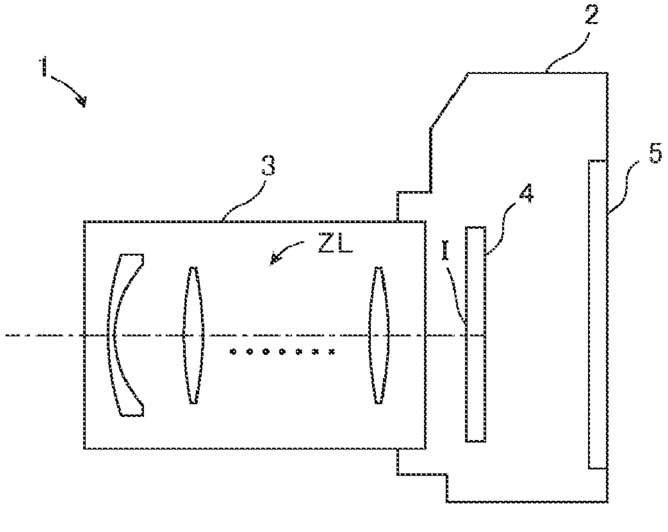
FIG. 9 is a diagram showing the configuration of a camera comprising a zoom optical system according to each embodiment.

Preferable embodiments according to the present invention will be described below. First, a camera (optical apparatus) comprising a zoom optical system according to the present embodiment will be described below with reference to FIG. 9. As shown in FIG. 9, this camera 1 comprises a body 2 and a photographing lens 3 mounted on the body 2. The body 2 includes an image capturing element 4, a body control part (not shown) configured to control digital camera operation, and a liquid crystal screen 5. The photographing lens 3 includes a zoom optical system ZL including a plurality of lens groups, and a lens position control mechanism (not shown) configured to control the position of each lens group. The lens position control mechanism includes a sensor configured to detect the position of each lens group, a motor configured to move each lens group forward and backward along an optical axis, a control circuit configured to drive the motor and the like.

Light from an object is collected by the zoom optical system ZL of the photographing lens 3 and incident on an image surface I of the image capturing element 4. After being incident on the image surface I, the light from the object is photoelectrically converted by the image capturing element 4 and recorded as digital image data in a non-shown memory. The digital image data recorded in the memory can be displayed on the liquid crystal screen 5 in accordance with an operation by a user. Note that the camera may be a mirrorless camera or may be a single-lens reflex type camera including a quick return mirror. The zoom optical system ZL shown in FIG. 9 schematically indicates the zoom optical system included in the photographing lens 3, and a lens configuration of the zoom optical system ZL is not limited to this configuration.

Figure 1:
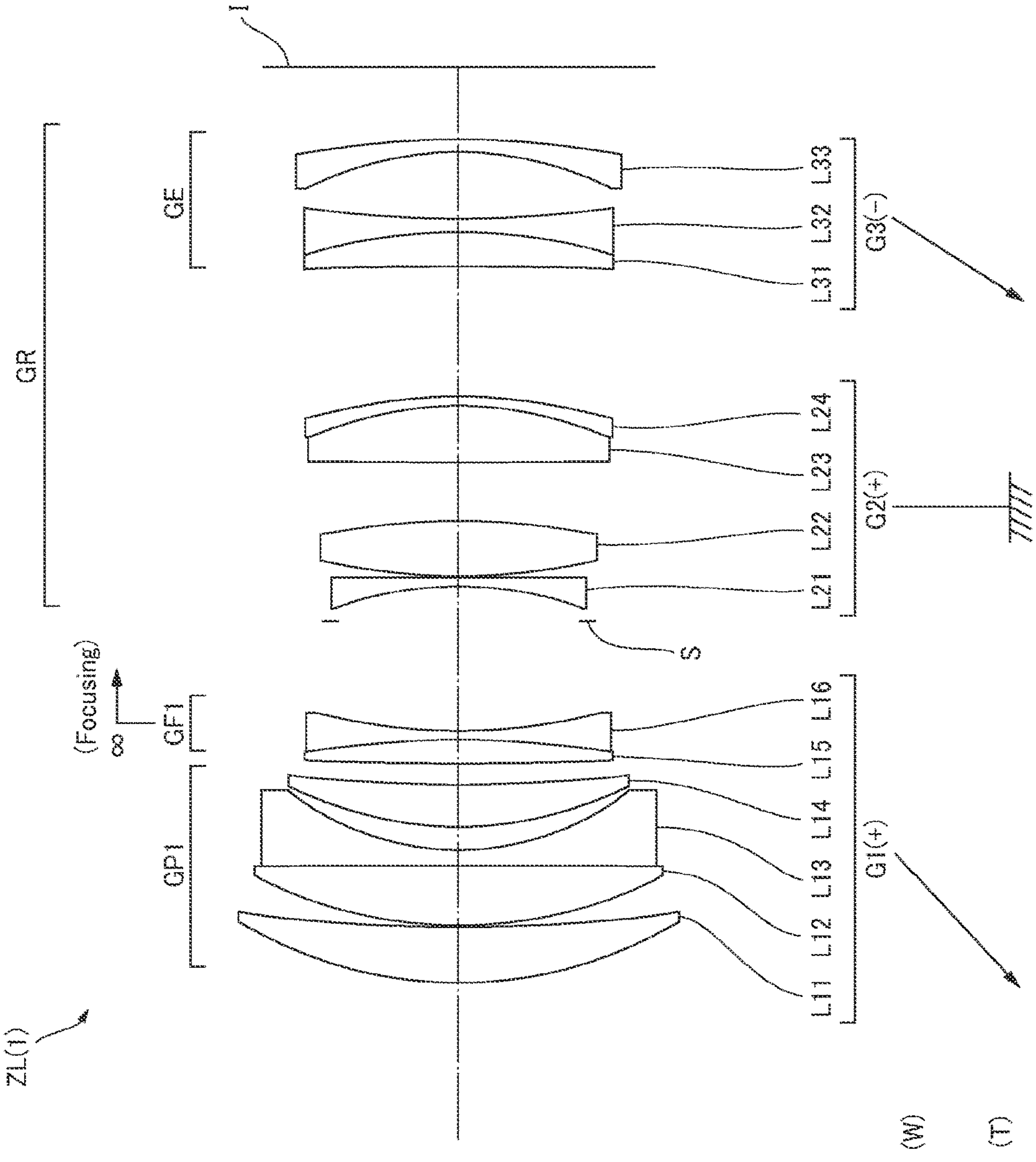
FIG. 1 is a diagram showing a lens configuration of a zoom optical system according to a first example.

A zoom optical system according to a first embodiment will be described below. As shown in FIG. 1, a zoom optical system ZL(1) as an exemplary zoom optical system (zoom lens) ZL according to the first embodiment consists of a first lens group G1 having positive refractive power and a rear group GR comprising a plurality of lens groups, the lens groups being arranged in order from an object side along the optical axis. The space between the lens groups adjacent to each other changes upon zooming. The plurality of lens groups in the rear group GR include a second lens group G2 having positive refractive power and disposed closest to the object side in the rear group GR.

With the above-described configuration, the zoom optical system ZL according to the first embodiment satisfies the following Conditional Expression (1).

$$0.15<f2/f1<0.80 \tag{1}$$

where, f1: the focal length of the first lens group G1, and f2: the focal length of the second lens group G2.

According to the first embodiment, it is possible to obtain a zoom optical system having a small size and bright and favorable optical performance, and an optical apparatus comprising the zoom optical system. The zoom optical system ZL according to the first embodiment may be a zoom optical system ZL(2) shown in FIG. 3, may be a zoom optical system ZL(3) shown in FIG. 5, and may be a zoom optical system ZL(4) shown in FIG. 7.

Conditional Expression (1) defines an appropriate relation between the focal length of the first lens group G1 and the focal length of the second lens group G2. Note that the focal length of the first lens group G1 is the focal length of the first lens group G1 upon focusing on infinity. When Conditional Expression (1) is satisfied, it is possible to obtain favorable optical performance in the entire range of zooming.

When the correspondence value of Conditional Expression (1) is out of the above-described range, it is difficult to obtain favorable optical performance in at least part of the range of zooming. It is possible to secure the advantageous effect of the present embodiment by setting the upper limit value of Conditional Expression (1) to 0.75, 0.70, 0.65, 0.60, 0.55, 0.50, 0.45, and 0.40. Moreover, it is possible to secure the advantageous effect of the present embodiment by setting the lower limit value of Conditional Expression (1) to 0.18, 0.20, 0.23, 0.25, 0.28, and 0.30.

A zoom optical system according to a second embodiment will be described below. As shown in FIG. 1, the zoom optical system ZL(1) as an exemplary zoom optical system (zoom lens) ZL according to the second embodiment consists of a first lens group G1 having positive refractive power and a rear group GR comprising a plurality of lens groups, the lens groups being arranged in order from an object side along the optical axis. Upon zooming from a wide-angle end state to a telephoto end state, the first lens group G1 moves to the object side along the optical axis and the space between the lens groups adjacent to each other changes. The first lens group G1 comprises a front fixed group GP1 having a position fixed relative to the image surface I upon focusing and a front focusing group GF1 that moves along the optical axis upon focusing, the groups being arranged in order from the object side along the optical axis.

With the above-described configuration, the zoom optical system ZL according to the second embodiment satisfies the following Conditional Expressions (2) and (3).

$$0.60<fP1/(-fF1)<1.00 \tag{2}$$

$$0.80<(-fF1)/fw<1.40 \tag{3}$$

where, fP1: the focal length of the front fixed group GP1, fF1: the focal length of the front focusing group GF1, and fw: the focal length of the zoom optical system ZL in the wide-angle end state.

According to the second embodiment, it is possible to obtain a zoom optical system having a small size and bright and favorable optical performance, and an optical apparatus comprising the zoom optical system. The zoom optical system ZL according to the second embodiment may be the zoom optical system ZL(2) shown in FIG. 3, may be the zoom optical system ZL(3) shown in FIG. 5, and may be the zoom optical system ZL(4) shown in FIG. 7.

Conditional Expression (2) defines an appropriate relation between the focal length of the front fixed group GP1 and the focal length of the front focusing group GF1. Conditional Expression (3) defines an appropriate relation between the focal length of the front focusing group GF1 and the focal length of the zoom optical system ZL in the wide-angle end state. When Conditional Expressions (2) and (3) are satisfied, it is possible to have a small size and favorable optical performance upon focusing on a close distance object.

When the correspondence value of Conditional Expression (2) is out of the above-described range, it is difficult to obtain favorable optical performance upon focusing on a close distance object. It is possible to secure the advantageous effect of the present embodiment by setting the upper limit value of Conditional Expression (2) to 0.98, 0.96, 0.95, 0.93, 0.90, 0.88, and 0.85. Moreover, it is possible to secure the advantageous effect of the present embodiment by setting the lower limit value of Conditional Expression (2) to 0.63, 0.65, 0.68, 0.70, 0.73, 0.75, 0.76, and 0.80.

When the correspondence value of Conditional Expression (3) is out of the above-described range, as well, it is difficult to obtain favorable optical performance upon focusing on a close distance object. It is possible to secure the advantageous effect of the present embodiment by setting the upper limit value of Conditional Expression (3) to 1.35, 1.33, 1.30, 1.26, 1.25, 1.23, and 1.20. Moreover, it is possible to secure the advantageous effect of the present embodiment by setting the lower limit value of Conditional Expression (3) to 0.83, 0.85, 0.88, 0.90, 0.93, 0.95, 0.96, and 1.00.

The zoom optical system ZL according to any of the first and second embodiments preferably satisfies the following Conditional Expression (4).

$$1.20<ft/fw<2.00 \quad (4)$$

where, ft: the focal length of the zoom optical system ZL in the telephoto end state, and fw: the focal length of the zoom optical system ZL in the wide-angle end state.

Conditional Expression (4) defines an appropriate range of the zooming ratio of the zoom optical system ZL. When Conditional Expression (4) is satisfied, it is possible to excellently correct a variety of aberrations such as curvature of field in the entire range of zooming.

When the correspondence value of Conditional Expression (4) exceeds the upper limit value, it is difficult to correct curvature of field in at least part of the range of zooming. It is possible to secure the advantageous effect of each embodiment by setting the upper limit value of Conditional Expression (4) to 1.90, 1.80, 1.70, and 1.60.

When the correspondence value of Conditional Expression (4) is below the lower limit value, the zooming ratio of the zoom optical system ZL is too small and thus the zoom optical system ZL cannot function as a zoom optical system (zoom lens). It is possible to secure the advantageous effect of each embodiment by setting the lower limit value of Conditional Expression (4) to 1.25, 1.30, 1.35, 1.40, 1.43, 1.45, and 1.48.

The zoom optical system ZL according to any of the first and second embodiments preferably satisfies the following Conditional Expression (5).

$$0.01<Bfw/TLw<0.20 \quad (5)$$

where,

Bfw: the back focus of the zoom optical system ZL in the wide-angle end state, and TLw: the entire length of the zoom optical system ZL in the wide-angle end state.

Conditional Expression (5) defines an appropriate relation between the back focus of the zoom optical system ZL in the wide-angle end state and the entire length of the zoom optical system ZL in the wide-angle end state. When Conditional Expression (5) is satisfied, it is possible to excellently correct curvature of field.

When the correspondence value of Conditional Expression (5) exceeds the upper limit value, the relative length of the back focus the zoom optical system ZL relative to the entire length thereof is too long and thus it is difficult to correct curvature of field. It is possible to secure the advantageous effect of each embodiment by setting the upper limit value of Conditional Expression (5) to 0.18, 0.15, 0.12, and 0.10.

When the correspondence value of Conditional Expression (5) is below the lower limit value, the entire length of the zoom optical system ZL is long and thus it is difficult to have the zoom optical system ZL in a small size and correct curvature of field. It is possible to secure the advantageous effect of each embodiment by setting the lower limit value of Conditional Expression (5) to 0.02, 0.04, 0.05, 0.06, and 0.07.

The zoom optical system ZL according to any of the first and second embodiments preferably satisfies the following Conditional Expression (6).

$$0.60<YLE/IHw<1.00 \quad (6)$$

where,

YLE: the effective diameter of a lens disposed closest to an image side in the zoom optical system ZL, and IHw: the maximum image height of the zoom optical system ZL in the wide-angle end state.

Conditional Expression (6) defines an appropriate relation between the effective diameter of the lens disposed closest to the image side in the zoom optical system ZL and the maximum image height of the zoom optical system ZL in the wide-angle end state. Hereinafter, the lens disposed closest to the image side in the zoom optical system ZL is also referred to as a final lens. In each embodiment, the effective diameter of the final lens is the effective diameter of a lens surface of the final lens on the image side in the wide-angle end state. When Conditional Expression (6) is satisfied, it is possible to excellently correct curvature of field.

When the correspondence value of Conditional Expression (6) exceeds the upper limit value, the effective diameter of the final lens is large and thus it is difficult to have the zoom optical system ZL in a small size and correct curvature of field. It is possible to secure the advantageous effect of each embodiment by setting the upper limit value of Conditional Expression (6) to 0.96, 0.95, 0.93, 0.90, 0.88, and 0.85.

When the correspondence value of Conditional Expression (6) is below the lower limit value, the effective diameter of the final lens is small and thus it is difficult to correct curvature of field. It is possible to secure the advantageous effect of each embodiment by setting the lower limit value of Conditional Expression (6) to 0.65, 0.70, 0.73, 0.75, 0.78, and 0.80.

The zoom optical system ZL according to any of the first and second embodiments preferably satisfies the following Conditional Expression (7).

$$FNOw<2.8 \quad (7)$$

where,

FNOw: the F-number of the zoom optical system ZL in the wide-angle end state.

Conditional Expression (7) defines an appropriate range of the F-number of the zoom optical system ZL in the wide-angle end state. Conditional Expression (7) is preferably satisfied because a bright zoom optical system is obtained. It is possible to secure the advantageous effect of each embodiment by setting the upper limit value of Conditional Expression (7) to 2.50, 2.40, 2.20, 2.00, and 1.90. The lower limit value of Conditional Expression (7) may be 1.20, 1.40, 1.50, 1.80 or larger.

The zoom optical system ZL according to any of the first and second embodiments preferably satisfies the following Conditional Expression (8).

$$10.00° < 2\omega w < 35.00° \quad (8)$$

where,

2ωw: the full angle of view of the zoom optical system ZL in the wide-angle end state.

Conditional Expression (8) defines an appropriate range of the full angle of view of the zoom optical system ZL in the wide-angle end state. Conditional Expression (8) is preferably satisfied because a zoom optical system in an intermediate telephoto range is obtained. It is possible to secure the advantageous effect of each embodiment by setting r limit value of Conditional Expression (8) to 32.00°, 30.00°, 29.00°, and 28.00°. It is possible to secure the advantageous effect of each embodiment by setting the lower limit value of Conditional Expression (8) to 15.00°, 20.00°, 24.00°, and 27.00°.

The zoom optical system ZL according to any of the first and second embodiments preferably satisfies the following Conditional Expression (9).

$$0.30 < fw/f1 < 0.70 \quad (9)$$

where, fw: the focal length of the zoom optical system ZL in the wide-angle end state, and f1: the focal length of the first lens group G1.

Conditional Expression (9) defines an appropriate relation between the focal length of the zoom optical system ZL in the wide-angle end state and the focal length of the first lens group G1. When Conditional Expression (9) is satisfied, it is possible to excellently correct spherical aberration in the entire range of zooming.

When the correspondence value of Conditional Expression (9) exceeds the upper limit value, the refractive power (power) of the first lens group G1 is too strong and thus it is difficult to correct spherical aberration. It is possible to secure the advantageous effect of each embodiment by setting the upper limit value of Conditional Expression (9) to 0.68, 0.65, 0.62, 0.58, and 0.55.

When the correspondence value of Conditional Expression (9) is below the lower limit value, the refractive power of the first lens group G1 is too weak and thus the zoom optical system ZL needs to be large. Thus, it is difficult to have the zoom optical system ZL in a small size and correct spherical aberration. It is possible to secure the advantageous effect of each embodiment by setting the lower limit value of Conditional Expression (9) to 0.33, 0.35, 0.38, 0.42, and 0.45.

In the zoom optical system ZL according to each of the first and second embodiments, the plurality of lens groups in the rear group GR preferably include the second lens group G2 having positive refractive power and disposed closest to the object side in the rear group GR, and the following Conditional Expression (10) is preferably satisfied.

$$0.30 < f2/fRw < 0.65 \quad (10)$$

where, f2: the focal length of the second lens group G2, and fRw: the combined focal length of the rear group GR in the wide-angle end state.

Conditional Expression (10) defines s an appropriate relation between the focal length of the second lens group G2 and the combined focal length of the rear group GR in the wide-angle end state. When Conditional Expression (10) is satisfied, it is possible to excellently correct spherical aberration in the entire range of zooming.

When the correspondence value of Conditional Expression (10) exceeds the upper limit value, the refractive power (power) of the second lens group G2 is too weak and thus it is difficult to correct curvature of field. It is possible to secure the advantageous effect of each embodiment by setting the upper limit value of Conditional Expression (10) to 0.62, 0.60, 0.58, 0.55, and 0.52.

When the correspondence value of Conditional Expression (10) is below the lower limit value, the refractive power of the second lens group G2 is too strong and thus it is difficult to correct spherical aberration. It is possible to secure the advantageous effect of each embodiment by setting the lower limit value of Conditional Expression (10) to 0.32, 0.34, 0.35, 0.36, 0.38, and 0.40.

In the zoom optical system ZL according to each of the first and second embodiments, the plurality of lens groups in the rear group GR preferably include a final lens group GE disposed closest to the image side in the rear group GR, and the following Conditional Expression (11) is preferably satisfied.

$$0.50 < (-fGE)/fw < 1.00 \quad (11)$$

where, fGE: the focal length of the final lens group GE.

fw: the focal length of the zoom optical system ZL in the wide-angle end state.

Conditional Expression (11) defines an appropriate relation between the focal length of the final lens group GE and the focal length of the zoom optical system ZL in the wide-angle end state. When Conditional Expression (11) is satisfied, the zoom optical system ZL can have a small size and excellently correct curvature of field.

When the correspondence value of Conditional Expression (11) exceeds the upper limit value, the refractive power (power) of the final lens group GE is too weak and thus it is difficult to correct curvature of field. It is possible to secure the advantageous effect of each embodiment by setting the upper limit value of Conditional Expression (11) to 0.98, 0.95, 0.93, 0.90, 0.88, 0.85, 0.83, and 0.80.

When the correspondence value of Conditional Expression (11) is below the lower limit value, the refractive power of the final lens group GE is too strong and thus it is difficult to correct distortion and chromatic aberration of magnification. It is possible to secure the advantageous effect of each embodiment by setting the lower limit value of Conditional Expression (11) to 0.53, 0.55, 0.58, 0.60, 0.63, 0.65, 0.68, 0.70, and 0.72.

The zoom optical system ZL according to any of the first and second embodiments preferably satisfies the following Conditional Expression (12).

$$1.00 < (L1r2 + L1r1)/(L1r2 - L1r1) < 2.50 \quad (12)$$

where,

L1r1: the radius of curvature of a lens surface of a lens disposed closest to the object side in the zoom optical system ZL, the lens surface being on the object side, and L1r2: the radius of curvature of a lens surface of the lens disposed closest to the object side in the zoom optical system ZL, the lens surface being on the image side.

Conditional Expression (12) defines an appropriate range of a shape factor of the lens disposed closest to the object side in the zoom optical system ZL. When Conditional Expression (12) is satisfied, it is possible to excellently correct a variety of aberrations such as coma aberration in the entire range of zooming.

When the correspondence value of Conditional Expression (12) exceeds the upper limit value, it is difficult to correct spherical aberration. It is possible to secure the advantageous effect of each embodiment by setting the upper limit value of Conditional Expression (12) to 2.40, 2.25, 2.10, 2.00, 1.95, 1.90, 1.85, and 1.80.

When the correspondence value of Conditional Expression (12) is below the lower limit value, it is difficult to correct coma aberration. It is possible to secure the advantageous effect of each embodiment by setting the lower limit value of Conditional Expression (12) to 1.05, 1.10, 1.15, 1.20, 1.25, 1.30, 1.35, and 1.40.

The zoom optical system ZL according to any of the first and second embodiments preferably satisfies the following Conditional Expression (13).

$$1.50<(LEr2+LEr1)/(LEr2-LEr1)<3.00 \quad (13)$$

where,

LEr1: the radius of curvature of a lens surface of the lens disposed closest to the image side in the zoom optical system ZL, the lens surface being on the object side, and LEr2: the radius of curvature of a lens surface of the lens disposed closest to the image side in the zoom optical system ZL, the lens surface being on the image side.

Conditional Expression (13) defines an appropriate range of a shape factor of the lens (final lens) disposed closest to the image side in the zoom optical system ZL. When Conditional Expression (13) is satisfied, it is possible to excellently correct a variety of aberrations such as curvature of field in the entire range of zooming.

When the correspondence value of Conditional Expression (13) exceeds the upper limit value, it is difficult to correct spherical aberration. It is possible to secure the advantageous effect of each embodiment by setting the upper limit value of Conditional Expression (13) to 2.90, 2.80, 2.70, 2.60, 2.50, 2.45, 2.40, 2.35, and 2.30.

When the correspondence value of Conditional Expression (13) is below the lower limit value, it is difficult to correct coma aberration. It is possible to secure the advantageous effect of each embodiment by setting the lower limit value of Conditional Expression (13) to 1.60, 1.65, 1.75, 1.80, 1.85, 1.90, 1.95, and 2.00.

The zoom optical system ZL according to any of the first and second embodiments preferably satisfies the following Conditional Expression (14).

$$1.00<f1/fRw<1.80 \quad (14)$$

where, f1: the focal length of the first lens group G1, and fRw: the combined focal length of the rear group GR in the wide-angle end state.

Conditional Expression (14) defines an appropriate relation between the focal length of the first lens group G1 and the combined focal length of the rear group GR in the wide-angle end state. When is satisfied, it Conditional Expression (14) is possible to excellently correct spherical aberration in the entire range of zooming.

When the correspondence value of Conditional Expression (14) exceeds the upper limit value, the refractive power (power) of the first lens group G1 is too weak and thus the zoom optical system ZL needs to be large. Thus, it is difficult to have the zoom optical system ZL in a small size and correct spherical aberration. It is possible to secure the advantageous effect of each embodiment by setting the upper limit value of Conditional Expression (14) to 1.75, 1.70, 1.68, 1.65, 1.63, and 1.60.

When the correspondence value of Conditional Expression (14) is below the lower limit value, the refractive power of the first lens group G1 is too strong and thus it is difficult to correct spherical aberration. It is possible to secure the advantageous effect of each embodiment by setting the lower limit value of Conditional Expression (14) to 1.03, 1.05, 1.08, and 1.10.

In the zoom optical system ZL according to each of the first and second embodiments, the plurality of lens groups in the rear group GR preferably include the second lens group G2 having positive refractive power and disposed closest to the object side in the rear group GR, and a third lens group G3 disposed side by side on the image side of the second lens group G2, and the space between the second lens group G2 and the third lens group G3 preferably decreases upon zooming from the wide-angle end state to the telephoto end state.

The zoom optical system ZL according to any of the first and second embodiments preferably comprises an aperture stop S disposed between the first lens group G1 and the rear group GR, and the first lens group G1 preferably moves along the optical axis together with the aperture stop S upon zooming.

In the zoom optical system ZL according to each of the first and second embodiments, the first lens group G1 preferably comprises the front focusing group GF1 that moves along the optical axis upon focusing, the rear group GR preferably comprises a rear focusing group GF2 that moves along the optical axis with a locus different from that of the front focusing group GF1 upon focusing, and at least part of any one of the plurality of lens groups in the rear group GR is preferably included in the rear focusing group GF2.

In the zoom optical system ZL according to each of the first and second embodiments, the front focusing group GF1 and the rear focusing group GF2 may satisfy the following Conditional Expression (15).

$$-0.30<fF2/fF1<0.30 \quad (15)$$

where, fF1: the focal length of the front focusing group GF1, and fF2: the focal length of the rear focusing group GF2.

Conditional Expression (15) defines an appropriate relation between the focal length of the front focusing group GF1 and the focal length of the rear focusing group GF2. When Conditional Expression (15) is satisfied, it is possible to excellently prevent variation in curvature of field upon focusing in the entire range of zooming.

When the correspondence value of Conditional Expression (15) exceeds the upper limit value, it is difficult to prevent variation in curvature of field upon focusing. It is possible to secure the advantageous effect of each embodiment by setting the upper limit value of Conditional Expression (15) to 0.28, 0.25, 0.23, 0.20, and 0.18.

When the correspondence value of Conditional Expression (15) is below the lower limit value, as well, it is difficult to prevent variation in curvature of field upon focusing. It is possible to secure the advantageous effect of each embodiment by setting the lower limit value of Conditional Expression (15) to −0.25, −0.15, −0.10, −0.05, −0.01, 0.01, and 0.02.

In the zoom optical system ZL according to each of the first and second embodiments, the front focusing group GF1 and the rear focusing group GF2 may satisfy the following Conditional Expression (16).

$$0.01<fF2/(-fF1)<0.30 \quad (16)$$

where, fF1: the focal length of the front focusing group GF1, and fF2: the focal length of the rear focusing group GF2.

Conditional Expression (16) defines an appropriate relation between the focal length of the front focusing group GF1 and the focal length of the rear focusing group GF2. When Conditional Expression (16) is satisfied, it is possible to excellently prevent variation in curvature of field upon focusing in the entire range of zooming.

When the correspondence value of Conditional Expression (16) exceeds the upper limit value, it is difficult to prevent variation in curvature of field upon focusing. It is possible to secure the advantageous effect of each embodiment by setting the upper limit value of Conditional Expression (16) to 0.28, 0.25, 0.23, 0.20, and 0.18.

When the correspondence value of Conditional Expression (16) is below the lower limit value, as well, it is difficult to prevent variation in curvature of field upon focusing. It is possible to secure the advantageous effect of each embodiment by setting the lower limit value of Conditional Expression (16) to 0.02.

Figure 10:
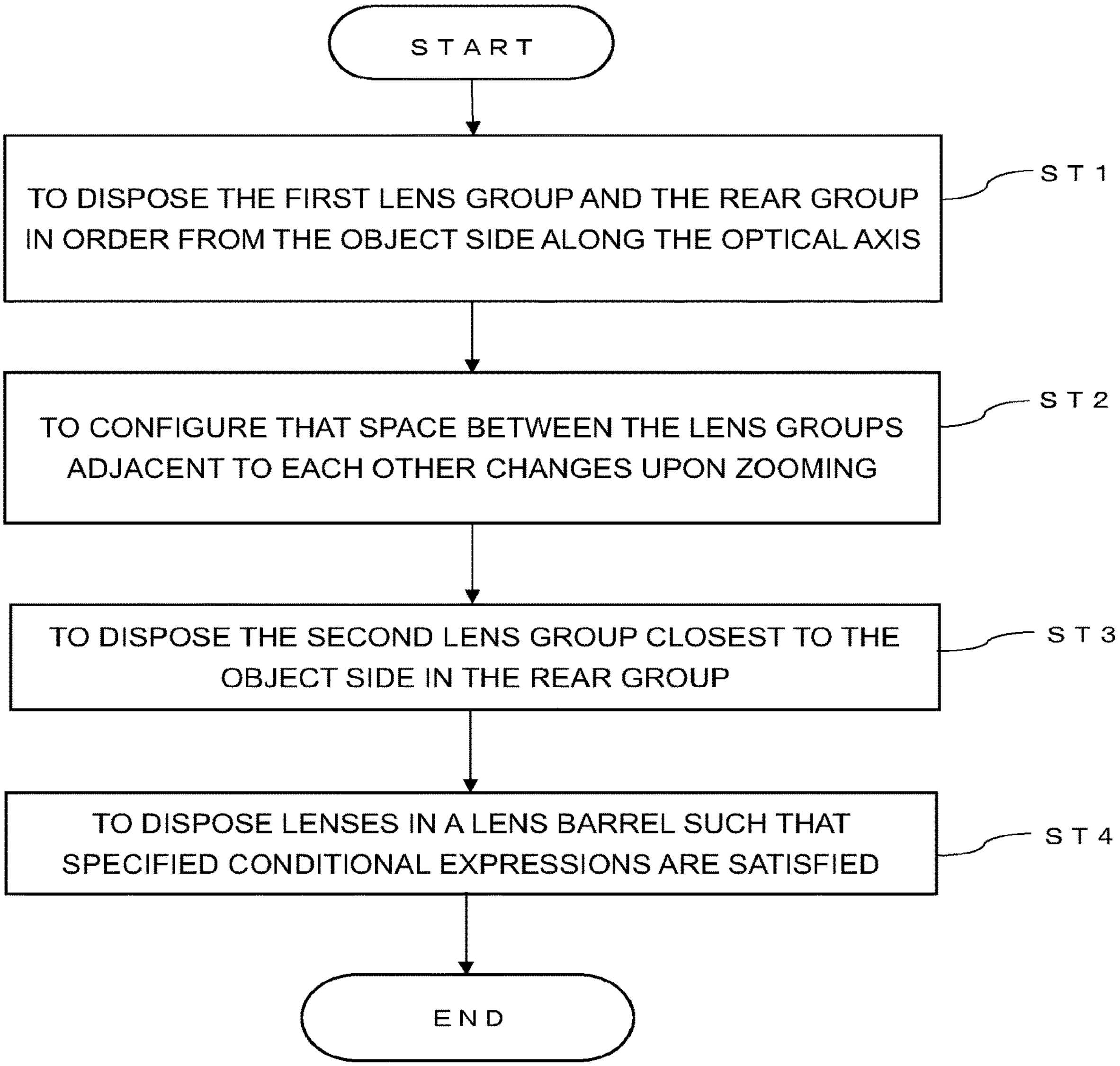
FIG. 10 is a flowchart showing a method for manufacturing a zoom optical system according to a first embodiment.

An outline of a method for manufacturing the zoom optical system ZL according to the first embodiment will be described below with reference to FIG. 10. First, the first lens group G1 having positive refractive power and the rear group GR comprising a plurality of lens groups are disposed in order from the object side along the optical axis (step ST1). Subsequently, the lens groups are configured so that the space between the lens groups adjacent to each other changes upon zooming (step ST2). Subsequently, the second lens group G2 having positive refractive power among the plurality of lens groups in the rear group GR is disposed closest to the object side in the rear group GR (step ST3). Then, lenses are disposed in a lens barrel such that at least Conditional Expression (1) described above is satisfied (step ST4). According to such a manufacturing method, it is possible to manufacture a zoom optical system having a small size and bright and favorable optical performance.

Figure 11:
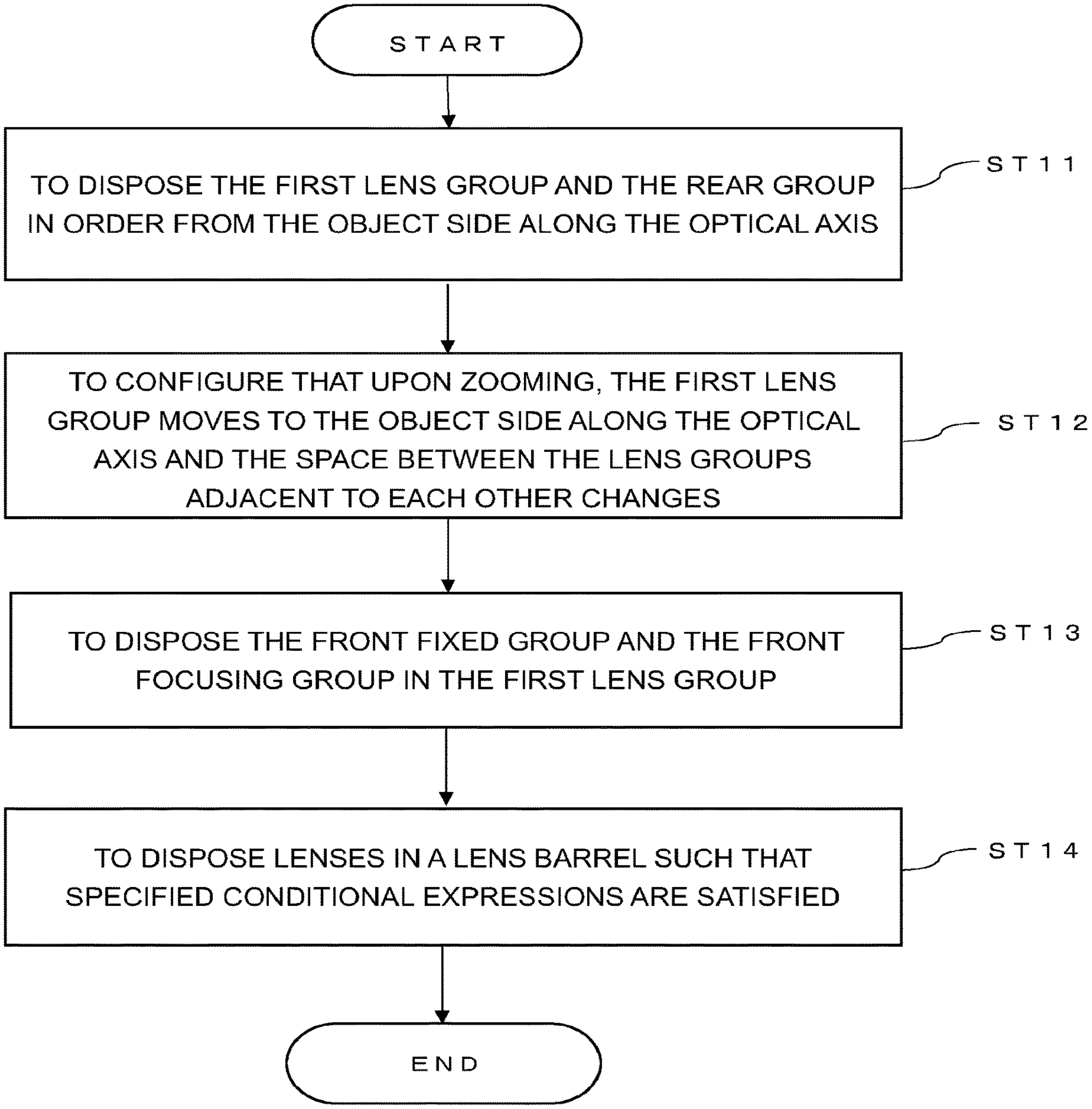
FIG. 11 is a flowchart showing a method for manufacturing a zoom optical system according to a second embodiment.

An outline of a method for manufacturing the zoom optical system ZL according to the second embodiment will be described below with reference to FIG. 11. First, the first lens group G1 having positive refractive power and the rear group GR comprising a plurality of lens groups are disposed in order from the object side along the optical axis (step ST11). Subsequently, the lens groups are configured such that, upon zooming from the wide-angle end state to the telephoto end state, the first lens group G1 moves to the object side along the optical axis and the space between the lens groups adjacent to each other changes (step ST12). Subsequently, the front fixed group GP1 having a position fixed relative to the image surface I upon focusing and the front focusing group GF1 that moves along the optical axis upon focusing are disposed in the first lens group G1 in order from the object side along the optical axis (step ST13). Then, lenses are disposed in the lens barrel such that at least Conditional Expressions (2) and (3) described above are satisfied (step ST14). According to such a manufacturing method, it is possible to manufacture a zoom optical system having a small size and bright and favorable optical performance.

EXAMPLES

The zoom optical system ZL according to an example of each embodiment will be described below with reference to the accompanying drawings. FIGS. 1, 3, 5, and 7 are cross-sectional views showing the configurations and refractive power distributions of zoom optical systems ZL {ZL(1) to ZL(4)} according to first to fourth examples. In the cross-sectional views of the zoom optical systems ZL(1) to ZL (4) according to the first to fourth examples, the moving direction of the focusing group along the optical axis upon focusing on from an infinite distance object to a close distance object is shown with an arrow denoted by "focusing". In the cross-sectional views of the zoom optical systems ZL(1) to ZL (4) according to the first to fourth examples, the moving direction of each lens group along the optical axis upon zooming from the wide-angle end state (W) to the telephoto end state (T) is shown with an arrow.

In FIGS. 1, 3, 5, and 7, each lens group is denoted by a combination of a reference sign "G" and a number, and each lens is denoted by a combination of a reference sign "L" and a number. In this case, each lens group or the like is denoted by using a combination of a reference sign and a number independently for each example to prevent complication due to increase in the kinds and magnitudes of reference signs and numbers. Accordingly, the same combination of a reference sign and a number in the examples does not necessarily mean identical components.

Among Tables 1 to 4 below, Table 1 is a table listing various data in the first example, Table 2 is a table listing various data in the second example, Table 3 is a table listing various data in the third example, and Table 4 is a table listing various data in the fourth example. In each example, aberration characteristics are calculated for the d-line (wavelength=587.6 nm) and the g-line (wavelength=435.8 nm).

In each table of [General Data], f represents the focal length of the entire lens system, FNO represents the F-number, 2ω represents the angle of view (in the unit of ° (degrees); ω represents the half angle of view), and Ymax represents the maximum image height. In addition, TL represents a distance as the sum of BF and the distance from a frontmost lens surface to a final lens surface on the optical axis upon focusing on infinity, and BF represents the distance (back focus) from the final lens surface to the image surface I on the optical axis upon focusing on infinity. Note that these values are listed for each of the zooming states of the wide-angle end (W) and the telephoto end (T).

In each table of [General Data], the value of YLE represents the effective diameter of the lens (final lens) disposed closest to the image side in the zoom optical system. The value of IHw represents the maximum image height of the zoom optical system in the wide-angle end state. The value of fP1 represents the focal length of the front fixed group. The value of fF1 represents the focal length of the front focusing group. The value of fRw represents the combined focal length of the rear group in the wide-angle end state. The value of fF2 represents the focal length of the rear focusing group.

In each table of [Lens Data], a surface number represents the order of an optical surface from the object side in a direction in which a light beam proceeds, R represents the radius of curvature (defined to have a positive value for a surface having a curvature center positioned on the image side) of an optical surface, D represents a surface distance that is the distance on the optical axis from an optical surface to the next optical surface (or the image surface), nd represents the refractive index of the material of an optical member at the d-line, and νd represents the Abbe number of the material of an optical member with reference to the d-line. The symbol "∞" for the radius of curvature indicates a flat surface or an opening, and "(aperture stop S)" represents an aperture stop S. Notation of the refractive index nd of air=1.00000 is omitted. When an optical surface is aspherical, the symbol "*" is attached to the surface number, and the paraxial radius of curvature is listed in the column of the radius R of curvature.

In each table of [Aspherical Surface Data], the shape of each aspherical surface listed in [Lens Specifications] is expressed by Expression (A) below. In the expression, X(y) represents a distance (sag amount) in the optical axis direction from a tangent plane at the apex of the aspherical surface to a position on the aspherical surface at a height y, R represents the radius of curvature (paraxial radius of curvature) of a reference spherical surface, k represents a conic constant, and Ai represents the i-th order aspherical coefficient. The notation "E−n" represents "$\times10^{-n}$". For example, 1.234E−05 represents $1.234\times10^{-5}$. Note that the secondary aspherical coefficient A2 is zero, and notation thereof is omitted.

$$X(y)=(y^2/R)/\{1+(1-\kappa\times y^2/R^2)^{1/2}\}+A4\times y^4+A6\times y^6+A8\times y^8+A10\times y^{10} \quad (A)$$

Each table of [Variable Distance Data] lists surface distance for a surface number i of the surface distance "Di" in the table of [Lens Specifications]. Each table of [Variable Distance Data] lists the surface distance upon focusing on infinity and the surface distance upon focusing on a close distance object state.

Each table of [Lens Group Data] lists the starting surface (surface closest to the object side) and focal length of each lens group.

Unless otherwise stated, the unit "mm" is typically used for all data values such as the focal length f, the radius R of curvature, the surface distance D, and other lengths listed in the tables below, but each optical system can obtain equivalent optical performance when proportionally scaled up or down, and thus the values are not limited to the unit.

The above description of the tables is common to all examples, and any duplicate description is omitted below.

First Example

The first example will be described below with reference to FIGS. 1 and 2 and Table 1. FIG. 1 is a diagram showing a lens configuration of the zoom optical system according to the first example. The zoom optical system ZL(1) according to the first example comprises a first lens group G1 having positive refractive power, an aperture stop S, a second lens group G2 having positive refractive power, and a third lens group G3 having negative refractive power, the lens groups being arranged in order from an object side along an optical axis. Upon zooming from a wide-angle end state (W) to a telephoto end state (T), the first lens group G1 and the third lens group G3 move to the object side along the optical axis and the space between the lens groups adjacent to each other changes. Upon zooming, the aperture stop S moves along the optical axis together with the first lens group G1 and the position of the second lens group G2 is fixed relative to the image surface I. Each sign (+) or (−) attached to the reference sign of a lens group represents the refractive power of the lens group, and this notation applies to all examples below as well.

The first lens group G1 comprises a positive meniscus lens L11 having a convex surface toward the object side, a cemented lens formed by cementing a positive meniscus lens L12 having a convex surface toward the object side and a negative meniscus lens L13 having a convex surface toward the object side, a positive meniscus lens L14 having a convex surface toward the object side, and a cemented lens formed by cementing a biconvex positive lens L15 and a biconcave negative lens L16, the lenses being arranged in order from the object side along the optical axis.

The second lens group G2 comprises a biconcave negative lens L21, a biconvex positive lens L22, and a cemented lens formed by cementing a biconvex positive lens L23 and a negative meniscus lens L24 having a concave surface toward the object side, the lenses being arranged in order from the object side along the optical axis. The positive lens L23 has an aspherical lens surface on the object side.

The third lens group G3 comprises a cemented lens formed by cementing a positive meniscus lens L31 having a concave surface toward the object side and a biconcave negative lens L32, and a negative meniscus lens L33 having a concave surface toward the object side, the lenses being arranged in order from the object side along the optical axis. The negative lens L32 has an aspherical surface lens on the image side. The image surface I is disposed on the image side of the third lens group G3.

In the present example, the second lens group G2 and the third lens group G3 serve as the rear group GR having positive refractive power as a whole. The third lens group G3 corresponds to the final lens group GE disposed closest to the image side in the rear group GR. The negative meniscus lens L33 in the third lens group G3 corresponds to the final lens. The positive meniscus lens L11, the cemented lens formed by cementing the positive meniscus lens L12 and the negative meniscus lens L13, and the positive meniscus lens L14 in the first lens group G1 serve as the front fixed group GP1 having a position fixed relative to the image surface I upon focusing. The cemented lens formed by cementing the positive lens L15 and the negative lens L16 in the first lens group G1 serves as the front focusing group GF1 that moves along the optical axis upon focusing. Upon focusing on from an infinite distance object to a close distance object, the front focusing group GF1 (cemented lens formed by cementing the positive lens L15 and the negative lens L16 in the first lens group G1) moves to the image side along the optical axis.

Table 1 below lists data values of the zoom optical system according to the first example.

TABLE 1

[General Data]

| | | |
|---|---|---|
| Zooming ratio = 1.497 | | |
| YLE = 18.000 | | IHw = 21.600 |
| fP1 = 84.022 | | fF1 = −101.078 |
| fRw = 119.920 | | |

| | W | T |
|---|---|---|
| f | 87.497 | 130.992 |
| FNO | 1.859 | 2.788 |
| 2ω | 27.50 | 18.79 |
| Ymax | 21.600 | 21.600 |

TABLE 1-continued

| | | |
|---|---|---|
| TL | 119.454 | 149.236 |
| Bf | 9.103 | 24.335 |

[Lens Data]

| Surface Number | R | D | nd | vd |
|---|---|---|---|---|
| 1 | 46.914 | 6.995 | 1.846660 | 23.8 |
| 2 | 166.537 | 0.200 | | |
| 3 | 47.658 | 7.580 | 1.593190 | 67.9 |
| 4 | 33336.213 | 2.000 | 1.846660 | 23.8 |
| 5 | 30.363 | 2.896 | | |
| 6 | 40.058 | 5.343 | 1.593190 | 67.9 |
| 7 | 165.681 | (D7) | | |
| 8 | 362.425 | 3.014 | 1.945944 | 18.0 |
| 9 | −100.065 | 1.100 | 1.850000 | 27.0 |
| 10 | 62.769 | (D10) | | |
| 11 | ∞ | (D11) | | (Aperture Stop S) |
| 12 | −39.802 | 1.100 | 1.720000 | 43.6 |
| 13 | 5040.621 | 0.200 | | |
| 14 | 65.807 | 6.882 | 1.696800 | 55.5 |
| 15 | −83.001 | 7.355 | | |
| 16* | 254.149 | 7.210 | 1.772500 | 49.6 |
| 17 | −39.577 | 1.100 | 1.846660 | 23.8 |
| 18 | −60.083 | (D18) | | |
| 19 | −412.223 | 4.304 | 1.846660 | 23.8 |
| 20 | −59.324 | 1.600 | 1.487490 | 70.3 |
| 21* | 87.613 | 8.473 | | |
| 22 | −37.483 | 1.600 | 1.834000 | 37.2 |
| 23 | −96.128 | Bf | | |

[Aspherical Surface Data]

16th Surface

κ = 1.0000, A4 = −4.16377E−06, A6 = 1.34984E−10, A8 = −2.63295E−12, A10 = 2.51738E−15

21st Surface

κ = 1.0000, A4 = −3.27383E−06, A6 = −4.18982E−09, A8 = 2.10935E−12, A10 = −1.03143E−14

[Variable Distance Data]

| | W | M | T |
|---|---|---|---|
| Upon focusing on infinity | | | |
| Focal length | 87.497 | 104.995 | 130.992 |
| Distance | ∞ | ∞ | ∞ |
| D7 | 2.675 | 2.675 | 2.675 |
| D10 | 13.768 | 13.768 | 13.768 |
| D11 | 4.479 | 17.898 | 34.262 |
| D18 | 16.479 | 9.390 | 1.246 |
| Bf | 9.103 | 16.191 | 24.335 |
| Upon focusing on a very short distance object | | | |
| Magnification | −0.085 | −0.103 | −0.131 |
| Distance | 1080.047 | 1066.880 | 1050.516 |
| D7 | 11.703 | 11.826 | 11.983 |
| D10 | 4.740 | 4.617 | 4.460 |
| D11 | 4.479 | 17.898 | 34.262 |
| D18 | 16.479 | 9.390 | 1.246 |
| Bf | 9.103 | 16.191 | 24.335 |

[Lens Group Data]

| Group | First surface | Focal length |
|---|---|---|
| G1 | 1 | 186.610 |
| G2 | 12 | 59.317 |
| G3 | 19 | −66.172 |

Figure 2A:
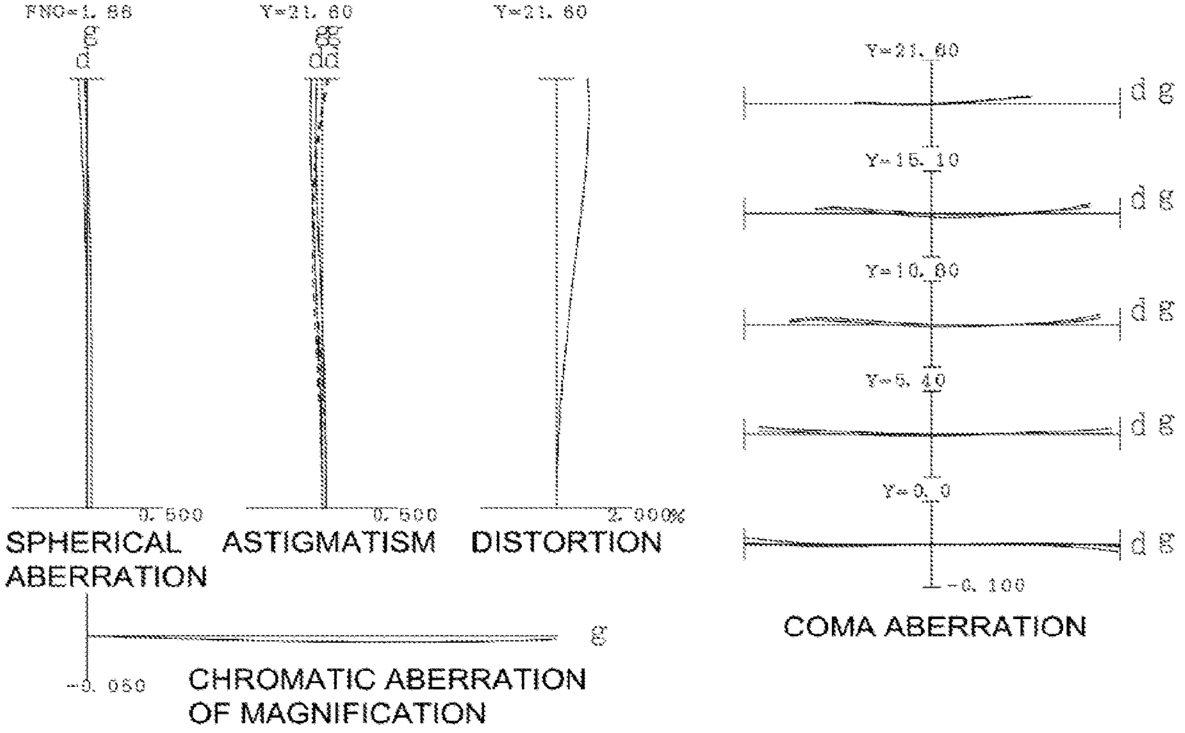
FIGS. 2A and 2B are a variety of aberration diagrams of the zoom optical system according to the first example upon focusing on infinity in a wide-angle end state and a telephoto end state, respectively.
Figure 2B:
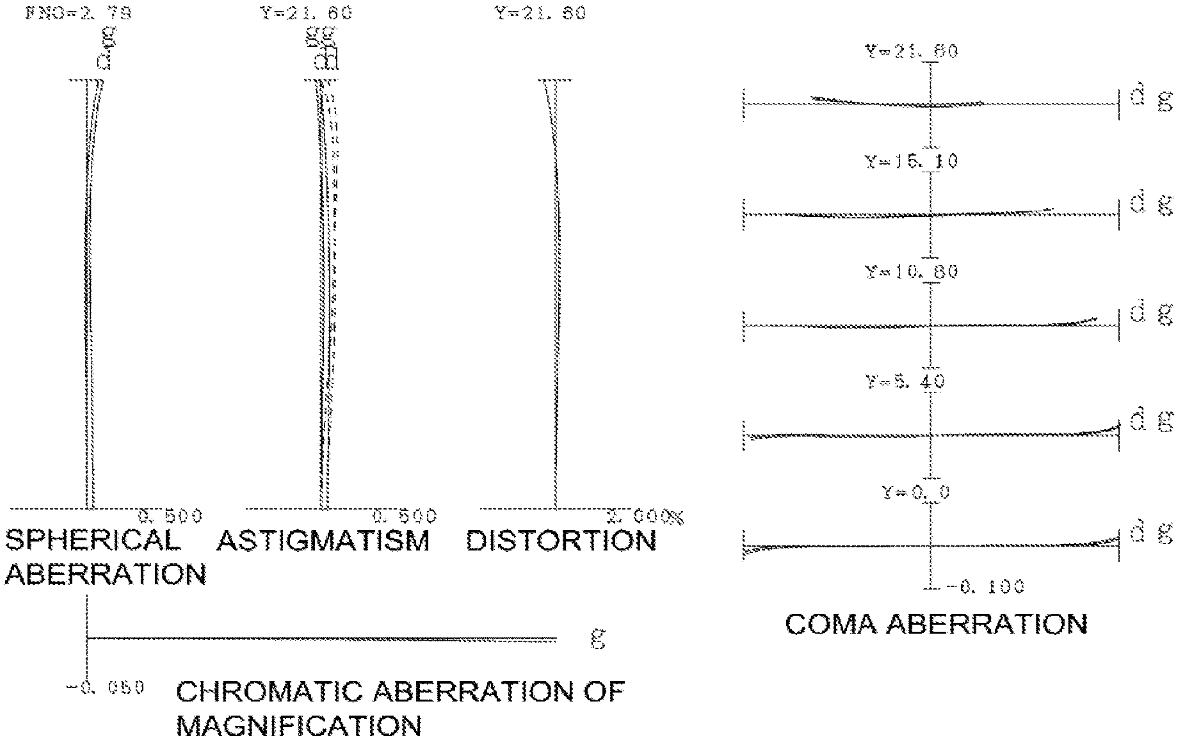

FIG. 2A is a variety of aberration diagrams of the zoom optical system according to the first example upon focusing on infinity in the wide-angle end state. FIG. 2B is a variety of aberration diagrams of the zoom optical system according to the first example upon focusing on infinity in the telephoto end state. In each aberration diagram, FNO represents the F-number, and Y represents the image height. Note that each spherical aberration diagram indicates the value of the F-number corresponding to the maximum diameter, each astigmatism diagram and each distortion diagram indicate the maximum value of the image height, and each coma aberration diagram indicates values of the image height. In the diagrams, d represents the d-line (wavelength λ=587.6 nm), and g represents the g-line (wavelength λ=435.8 nm). In each astigmatism diagram, a solid line represents a sagittal image surface, and a dashed line represents a meridional image surface. Note that the same reference signs as in the present example are also used in the aberration diagrams of each example described below, and duplicate description thereof is omitted.

From the variety of aberration diagrams, it can be understood that the zoom optical system according to the first example has a variety of aberrations excellently corrected in both the wide-angle end state and the telephoto end state and has excellent imaging performance.

Second Example

Figure 3:
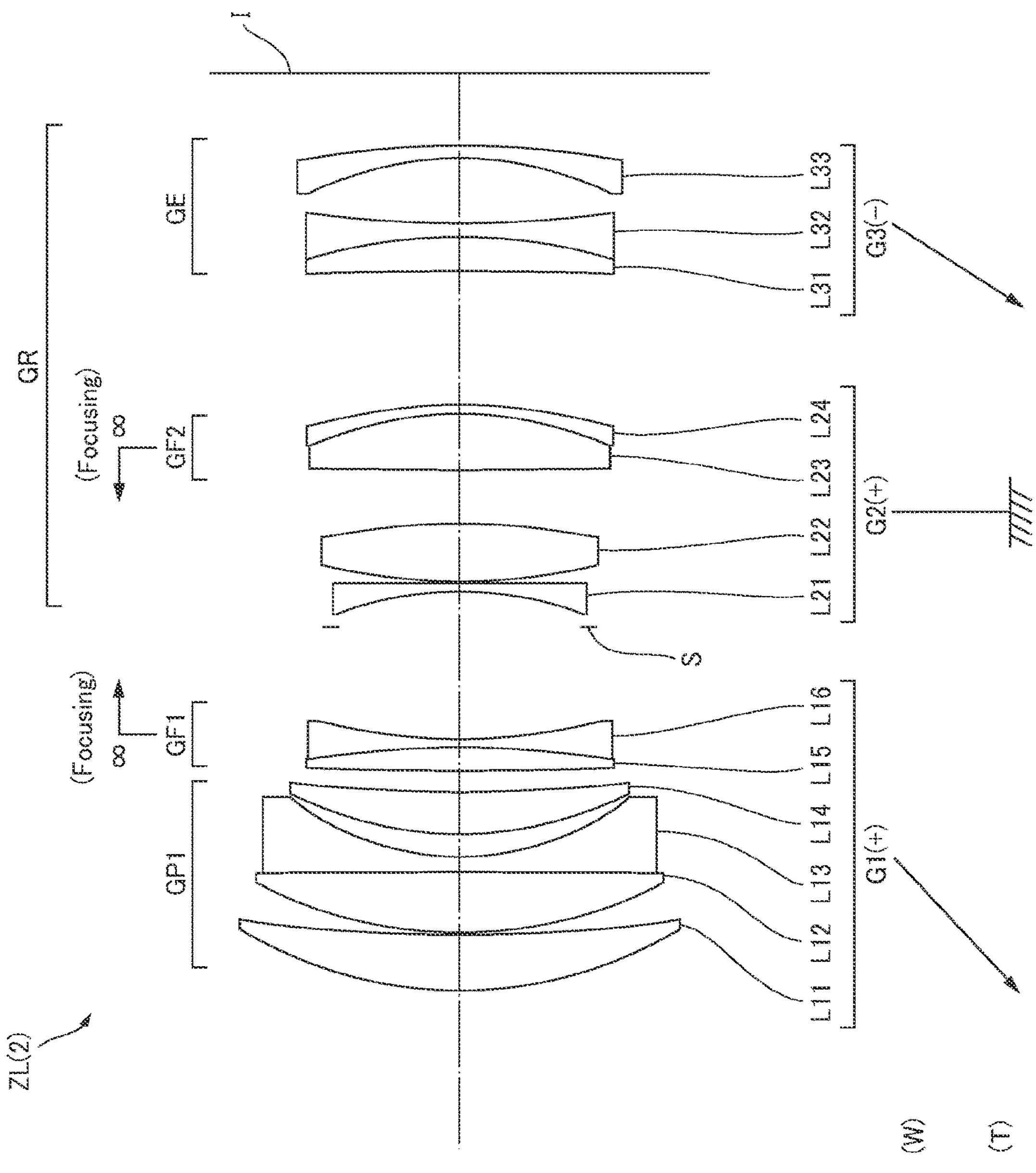
FIG. 3 is a diagram showing a lens configuration of a zoom optical system according to a second example.

The second example will be described below with reference to FIGS. 3 and 4 and Table 2. FIG. 3 is a diagram showing a lens configuration of the zoom optical system according to the second example. The zoom optical system ZL(2) according to the second example comprises a first lens group G1 having positive refractive power, an aperture stop S, a second lens group G2 having positive refractive power, and a third lens group G3 having negative refractive power, the lens groups being arranged in order from an object side along an optical axis. Upon zooming from a wide-angle end state (W) to a telephoto end state (T), the first lens group G1 and the third lens group G3 move to the object side along the optical axis and the space between the lens groups adjacent to each other changes. Upon zooming, the aperture stop S moves along the optical axis together with the first lens group G1 and the position of the second lens group G2 is fixed relative to the image surface I.

The first lens group G1 comprises a positive meniscus lens L11 having a convex surface toward the object side, a cemented lens formed by cementing a biconvex positive lens L12 and a biconcave negative lens L13, a positive meniscus lens L14 having a convex surface toward the object side, and a cemented lens formed by cementing a biconvex positive lens L15 and a biconcave negative lens L16, the lenses being arranged in order from the object side along the optical axis.

The second lens group G2 comprises a biconcave negative lens L21, a biconvex positive lens L22, and a cemented lens formed by cementing a biconvex positive lens L23 and a negative meniscus lens L24 having a concave surface toward the object side, the lenses being arranged in order from the object side along the optical axis. The positive lens L23 has an aspherical lens surface on the object side.

The third lens group G3 comprises a cemented lens formed by cementing a positive meniscus lens L31 having a concave surface toward the object side and a biconcave negative lens L32, and a negative meniscus lens L33 having a concave surface toward the object side, the lenses being arranged in order from the object side along the optical axis. The negative lens L32 has an aspherical surface lens on the image side. The image surface I is disposed on the image side of the third lens group G3.

In the present example, the second lens group G2 and the third lens group G3 serve as the rear group GR having positive refractive power as a whole. The third lens group G3 corresponds to the final lens group GE disposed closest to the image side in the rear group GR. The negative meniscus lens L33 in the third lens group G3 corresponds to the final lens. The positive meniscus lens L11, the cemented lens formed by cementing the positive lens L12 and the negative lens L13, and the positive meniscus lens L14 in the first lens group G1 serve as the front fixed group GP1 having a position fixed relative to the image surface I upon focusing. The cemented lens formed by cementing the positive lens L15 and the negative lens L16 in the first lens group G1 serves as the front focusing group GF1 that moves along the optical axis upon focusing. The cemented lens formed by cementing the positive lens L23 and the negative meniscus lens L24 in the second lens group G2 serves as the rear focusing group GF2 that moves along the optical axis upon focusing. Upon focusing on from an infinite distance object to a close distance object, the front focusing group GF1 (cemented lens formed by cementing the positive lens L15 and the negative lens L16 in the first lens group G1) moves to the image side along the optical axis and the rear focusing group GF2 (cemented lens formed by cementing the positive lens L23 and the negative meniscus lens L24 in the second lens group G2) moves to the object side along the optical axis.

Table 2 below lists data values of the zoom optical system according to the second example.

TABLE 2

[General Data]

| | |
|---|---|
| Zooming ratio = 1.499 | |
| YLE = 18.000 | IHw = 21.600 |
| fP1 = 82.997 | fF1 = −99.080 |
| fRw = 118.936 | fF2 = 671.573 |

| | W | T |
|---|---|---|
| f | 87.387 | 131.002 |
| FNO | 1.859 | 2.791 |
| 2ω | 27.48 | 18.77 |
| Ymax | 21.600 | 21.600 |
| TL | 115.452 | 145.326 |
| Bf | 9.106 | 24.310 |

[Lens Data]

| Surface Number | R | D | nd | νd |
|---|---|---|---|---|
| 1 | 48.237 | 6.840 | 1.846660 | 23.8 |
| 2 | 176.058 | 0.201 | | |
| 3 | 47.311 | 7.706 | 1.593190 | 67.9 |
| 4 | −10977.113 | 2.000 | 1.846660 | 23.8 |
| 5 | 30.989 | 2.743 | | |
| 6 | 40.022 | 5.341 | 1.593190 | 67.9 |
| 7 | 158.515 | (D7) | | |
| 8 | 288.236 | 3.092 | 1.945944 | 18.0 |
| 9 | −101.965 | 1.100 | 1.850000 | 27.0 |
| 10 | 58.937 | (D10) | | |
| 11 | ∞ | (D11) | | (Aperture Stop S) |
| 12 | −38.826 | 1.100 | 1.720000 | 43.6 |
| 13 | 1908.000 | 0.200 | | |
| 14 | 63.919 | 7.360 | 1.696800 | 55.5 |
| 15 | −78.285 | (D15) | | |
| 16* | 305.745 | 7.228 | 1.772500 | 49.6 |
| 17 | −38.870 | 1.100 | 1.846660 | 23.8 |
| 18 | −58.392 | (D18) | | |
| 19 | −329.356 | 4.313 | 1.846660 | 23.8 |
| 20 | −57.876 | 1.600 | 1.487490 | 70.3 |
| 21* | 88.263 | 8.353 | | |
| 22 | −38.199 | 1.600 | 1.834000 | 37.2 |
| 23 | −96.156 | Bf | | |

TABLE 2-continued

[Aspherical Surface Data]

16th Surface

κ = 1.0000, A4 = −4.42907E−06, A6 = 2.27606E−10,
A8 = −3.87693E−12, A10 = 4.36472E−15

21st Surface

κ = 1.0000, A4 = −3.09349E−06, A6 = −4.12964E−09,
A8 = 3.11255E−12, A10 = −9.85811E−15

[Variable Distance Data]

| | W | M | T |
|---|---|---|---|
| Upon focusing on infinity | | | |
| Focal length | 87.387 | 105.000 | 131.002 |
| Distance | ∞ | ∞ | ∞ |
| D7 | 2.600 | 2.600 | 2.600 |
| D10 | 13.859 | 13.859 | 13.859 |
| D11 | 4.529 | 18.085 | 34.404 |
| D15 | 6.736 | 6.736 | 6.736 |
| D18 | 16.744 | 9.652 | 1.541 |
| Bf | 9.106 | 16.198 | 24.310 |
| Upon focusing on a very short distance object | | | |
| Magnification | −0.105 | −0.128 | −0.160 |
| Distance | 880.077 | 866.739 | 850.411 |
| D7 | 12.676 | 13.336 | 12.579 |
| D10 | 3.783 | 3.123 | 3.881 |
| D11 | 4.529 | 18.085 | 34.404 |
| D15 | 6.092 | 6.334 | 5.007 |
| D18 | 17.389 | 10.053 | 3.269 |
| Bf | 9.106 | 16.199 | 24.310 |

[Lens Group Data]

| Group | First surface | Focal length |
|---|---|---|
| G1 | 1 | 185.733 |
| G2 | 12 | 58.900 |
| G3 | 19 | −66.353 |

Figure 4A:
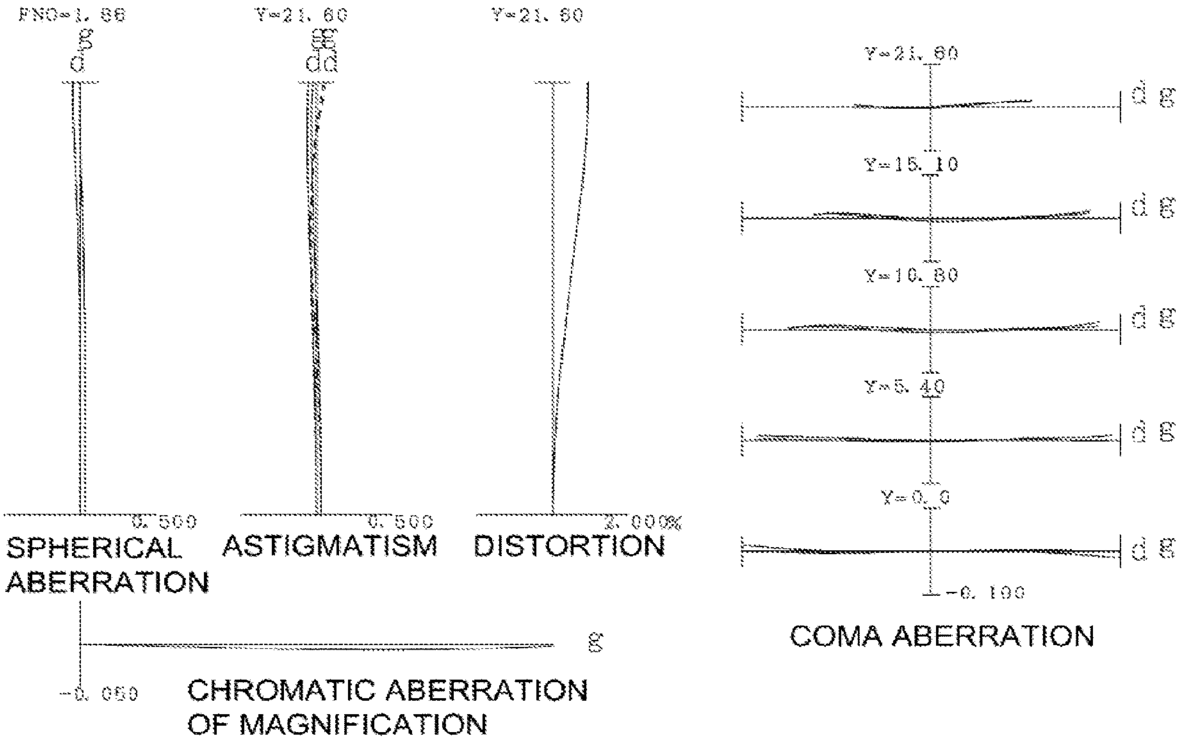
FIGS. 4A and 4B are a variety of aberration diagrams of the zoom optical system according to the second example upon focusing on infinity in a wide-angle end state and a telephoto end state, respectively.
Figure 4B:
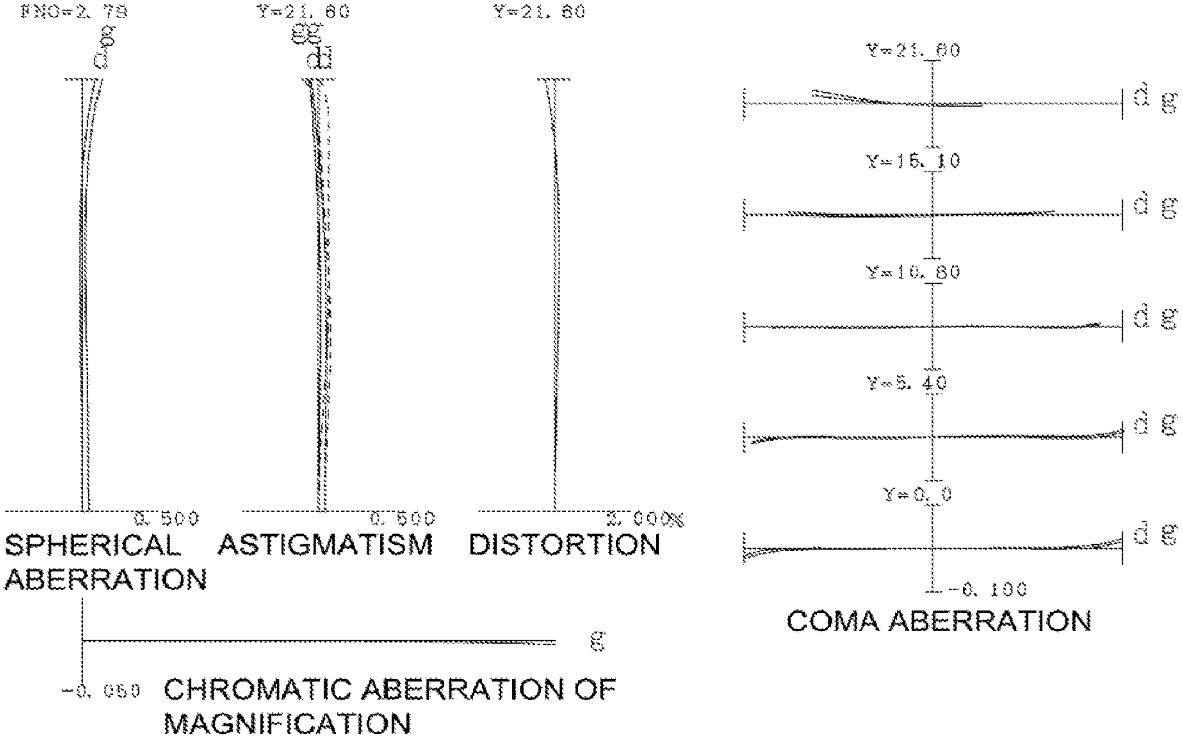

FIG. 4A is a variety of aberration diagrams of the zoom optical system according to the second example upon focusing on infinity in the wide-angle end state. FIG. 4B is a variety of aberration diagrams of the zoom optical system according to the second example upon focusing on infinity in the telephoto end state. From the variety of aberration diagrams, it can be understood that the zoom optical system according to the second example has a variety of aberrations excellently corrected in both the wide-angle end state and the telephoto end state and has excellent imaging performance.

Third Example

Figure 5:
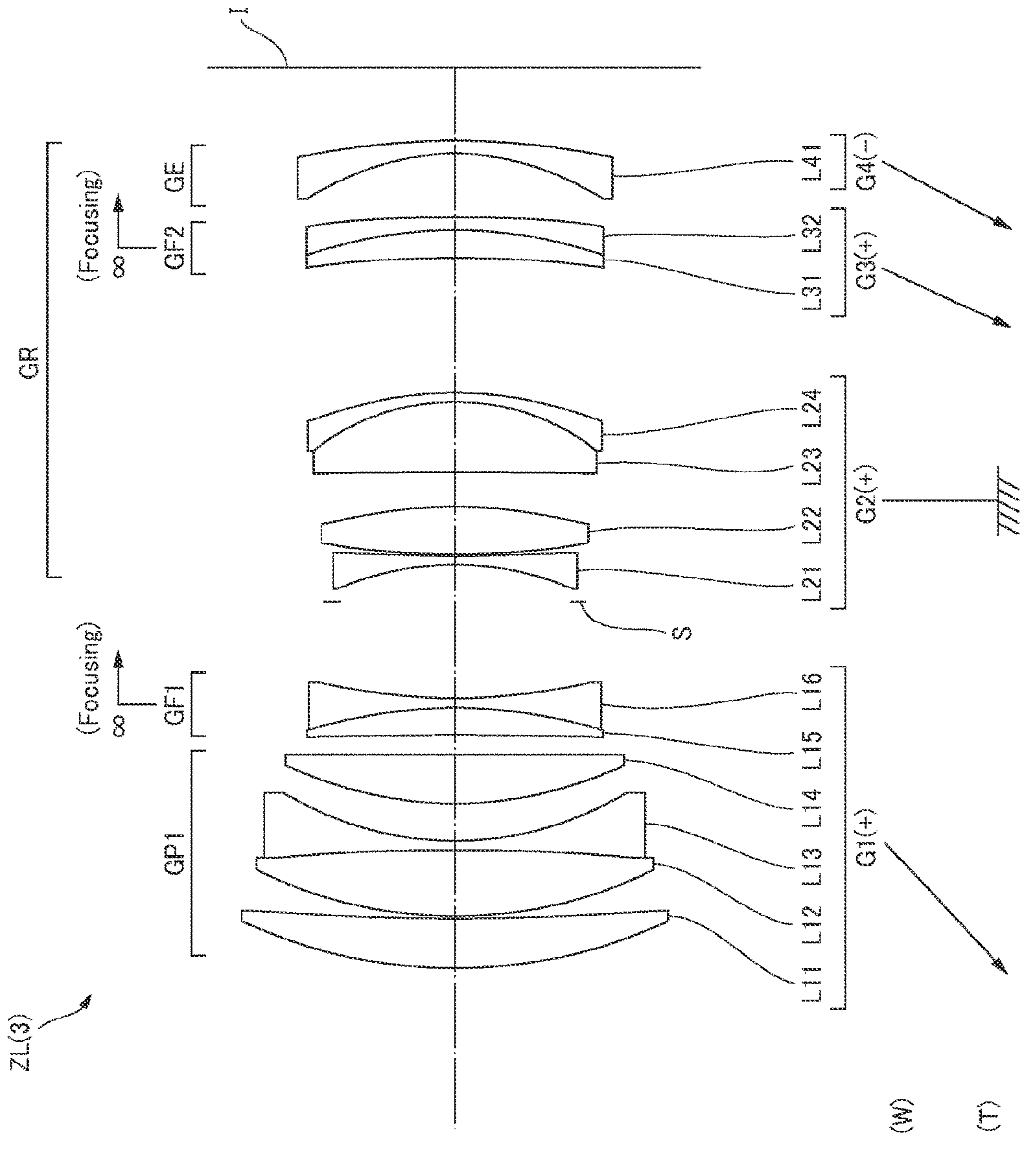
FIG. 5 is a diagram showing a lens configuration of a zoom optical system according to a third example.

The third example will be described below with reference to FIGS. 5 and 6 and Table 3. FIG. 5 is a diagram showing a lens configuration of the zoom optical system according to the third example. The zoom optical system ZL(3) according to the third example comprises a first lens group G1 having positive refractive power, an aperture stop S, a second lens group G2 having positive refractive power, a third lens group G3 having positive refractive power, and a fourth lens group G4 having negative refractive power, the lens groups being arranged in order from an object side along an optical axis. Upon zooming from a wide-angle end state (W) to a telephoto end state (T), the first lens group G1, the third lens group G3, and the fourth lens group G4 move to the object side along the optical axis and the space between the lens groups adjacent to each other changes. Upon zooming, the aperture stop S moves along the optical axis together with the first lens group G1 and the position of the second lens group G2 is fixed relative to the image surface I.

The first lens group G1 comprises a positive meniscus lens L11 having a convex surface toward the object side, a cemented lens formed by cementing a biconvex positive lens L12 and a biconcave negative lens L13, a biconvex positive lens L14, and a cemented lens formed by cementing a positive meniscus lens L15 having a concave surface toward the object side and a biconcave negative lens L16, the lenses being arranged in order from the object side along the optical axis.

The second lens group G2 comprises a biconcave negative lens L21, a biconvex positive lens L22, and a cemented lens formed by cementing a biconvex positive lens L23 and a negative meniscus lens L24 having a concave surface toward the object side, the lenses being arranged in order from the object side along the optical axis. The positive lens L23 has an aspherical lens surface on the object side.

The third lens group G3 comprises a cemented lens formed by cementing a positive meniscus lens L31 having a concave surface toward the object side and a negative meniscus lens L32 having a concave surface toward the object side, the lenses being arranged in order from the object side along the optical axis. The negative meniscus lens L32 has an aspherical surface lens on the image side.

The fourth lens group G4 comprises a negative meniscus lens L41 having a concave surface toward the object side. The image surface I is disposed on the image side of the fourth lens group G4.

In the present example, the second lens group G2, the third lens group G3, and the fourth lens group G4 serve as the rear group GR having positive refractive power as a whole. The fourth lens group G4 corresponds to the final lens group GE disposed closest to the image side in the rear group GR. The negative meniscus lens L41 in the fourth lens group G4 corresponds to the final lens. The positive meniscus lens L11 in the first lens group G1, the cemented lens formed by cementing the positive lens L12 and the negative lens L13, and the positive lens L14 serve as the front fixed group GP1 having a position fixed relative to the image surface I upon focusing. The cemented lens formed by cementing the positive meniscus lens L15 and the negative lens L16 in the first lens group G1 serves as the front focusing group GF1 that moves along the optical axis upon focusing. The entire third lens group G3 serves as the rear focusing group GF2 that moves along the optical axis upon focusing. Upon focusing on from an infinite distance object to a close distance object, the front focusing group GF1 (cemented lens formed by cementing the positive meniscus lens L15 and the negative lens L16 in the first lens group G1) moves to the image side along the optical axis and the rear focusing group GF2 (entire third lens group G3) moves to the image side along the optical axis with a locus (moving amount) different from that of the front focusing group GF1.

Table 3 below lists data values of the zoom optical system according to the third example.

TABLE 3

[General Data]

| | |
|---|---|
| Zooming ratio = 1.497 | |
| YLE = 18.000 | IHw = 21.600 |
| fP1 = 74.366 | fF1 = −90.157 |
| fRw = 147.649 | fF2 = 2886.045 |

TABLE 3-continued

| | W | T |
|---|---|---|
| f | 87.500 | 131.001 |
| FNO | 1.858 | 2.786 |
| 2ω | 27.43 | 18.80 |
| Ymax | 21.600 | 21.600 |
| TL | 116.222 | 142.023 |
| Bf | 9.251 | 25.667 |

[Lens Data]

| Surface Number | R | D | nd | νd |
|---|---|---|---|---|
| 1 | 56.682 | 6.478 | 1.846660 | 23.8 |
| 2 | 318.773 | 0.200 | | |
| 3 | 50.234 | 8.612 | 1.593190 | 67.9 |
| 4 | −271.667 | 1.200 | 1.854779 | 24.8 |
| 5 | 37.409 | 4.817 | | |
| 6 | 44.054 | 6.278 | 1.497820 | 82.6 |
| 7 | −2142.172 | (D7) | | |
| 8 | −369.420 | 3.507 | 1.922860 | 20.9 |
| 9 | −52.787 | 1.100 | 1.770470 | 29.7 |
| 10 | 67.323 | (D10) | | |
| 11 | ∞ | (D11) | | (Aperture Stop S) |
| 12 | −34.128 | 1.100 | 1.723420 | 38.0 |
| 13 | 306.831 | 0.200 | | |
| 14 | 92.900 | 6.152 | 1.834810 | 42.7 |
| 15 | −56.452 | 4.410 | | |
| 16* | 875.397 | 9.115 | 1.693430 | 53.3 |
| 17 | −26.311 | 1.100 | 1.850260 | 32.4 |
| 18 | −44.283 | (D18) | | |
| 19 | −132.378 | 3.586 | 1.846660 | 23.8 |
| 20 | −50.802 | 1.600 | 1.588870 | 61.1 |
| 21* | −371.956 | (D21) | | |
| 22 | −29.395 | 1.600 | 1.693500 | 53.2 |
| 23 | −86.978 | Bf | | |

[Aspherical Surface Data]

16th Surface

κ = 1.0000, A4 = −4.22271E−06, A6 = −3.12823E−10, A8 = −1.96537E−12, A10 = 2.59367E−15

21st Surface

κ = 1.0000, A4 = −6.06022E−06, A6 = −5.54411E−09, A8 = −1.79582E−12, A10 = −6.81506E−15

[Variable Distance Data]

| | W | M | T |
|---|---|---|---|
| Upon focusing on infinity | | | |
| Focal length | 87.500 | 105.000 | 131.001 |
| Distance | ∞ | ∞ | ∞ |
| D7 | 2.737 | 2.737 | 2.737 |
| D10 | 12.555 | 12.555 | 12.555 |
| D11 | 4.854 | 16.294 | 30.654 |
| D18 | 17.472 | 10.297 | 2.001 |
| D21 | 8.299 | 7.849 | 7.354 |
| Bf | 9.251 | 16.876 | 25.667 |
| Upon focusing on a very short distance object | | | |
| Magnification | −0.104 | −0.127 | −0.161 |
| Distance | 880.418 | 868.885 | 854.626 |
| D7 | 11.412 | 11.574 | 11.749 |
| D10 | 3.881 | 3.719 | 3.543 |
| D11 | 4.854 | 16.294 | 30.654 |
| D18 | 19.896 | 11.712 | 3.066 |
| D21 | 5.875 | 6.434 | 6.289 |
| Bf | 9.283 | 16.924 | 25.744 |

[Lens Group Data]

| Group | First surface | Focal length |
|---|---|---|
| G1 | 1 | 163.682 |
| G2 | 12 | 62.062 |

TABLE 3-continued

| | | |
|---|---|---|
| G3 | 19 | 2886.045 |
| G4 | 22 | −64.759 |

Figure 6A:
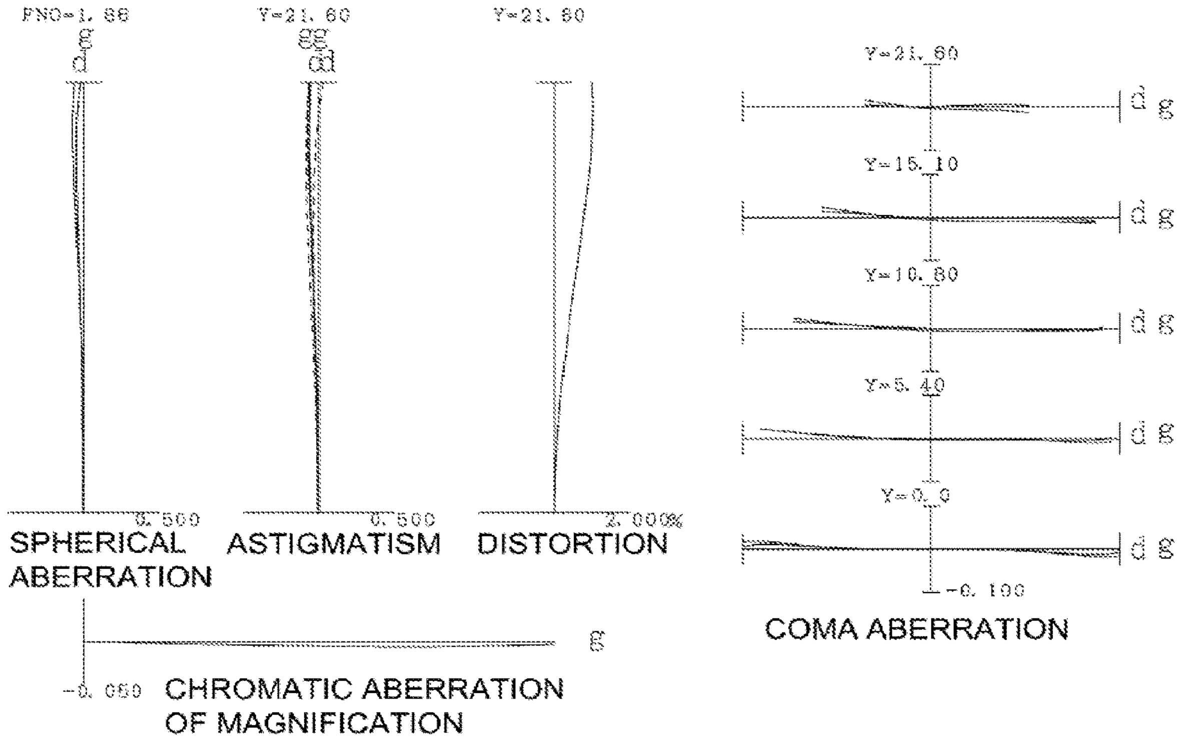
FIGS. 6A and 6B are a variety of aberration diagrams of the zoom optical system according to the third example upon focusing on infinity in a wide-angle end state and a telephoto end state, respectively.
Figure 6B:
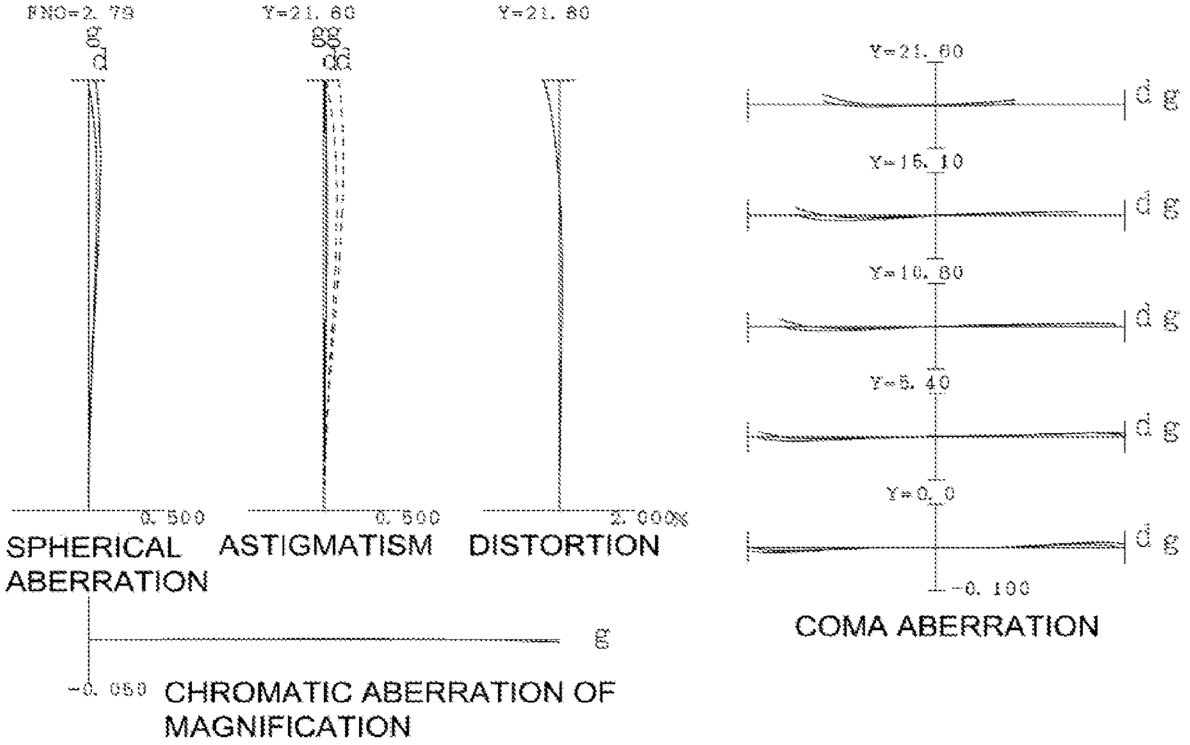

FIG. 6A is a variety of aberration diagrams of the zoom optical system according to the third example upon focusing on infinity in the wide-angle end state. FIG. 6B is a variety of aberration diagrams of the zoom optical system according to the third example upon focusing on infinity in the telephoto end state. From the variety of aberration diagrams, it can be understood that the zoom optical system according to the third example has a variety of aberrations excellently corrected in both the wide-angle end state and the telephoto end state and has excellent imaging performance.

Fourth Example

Figure 7:
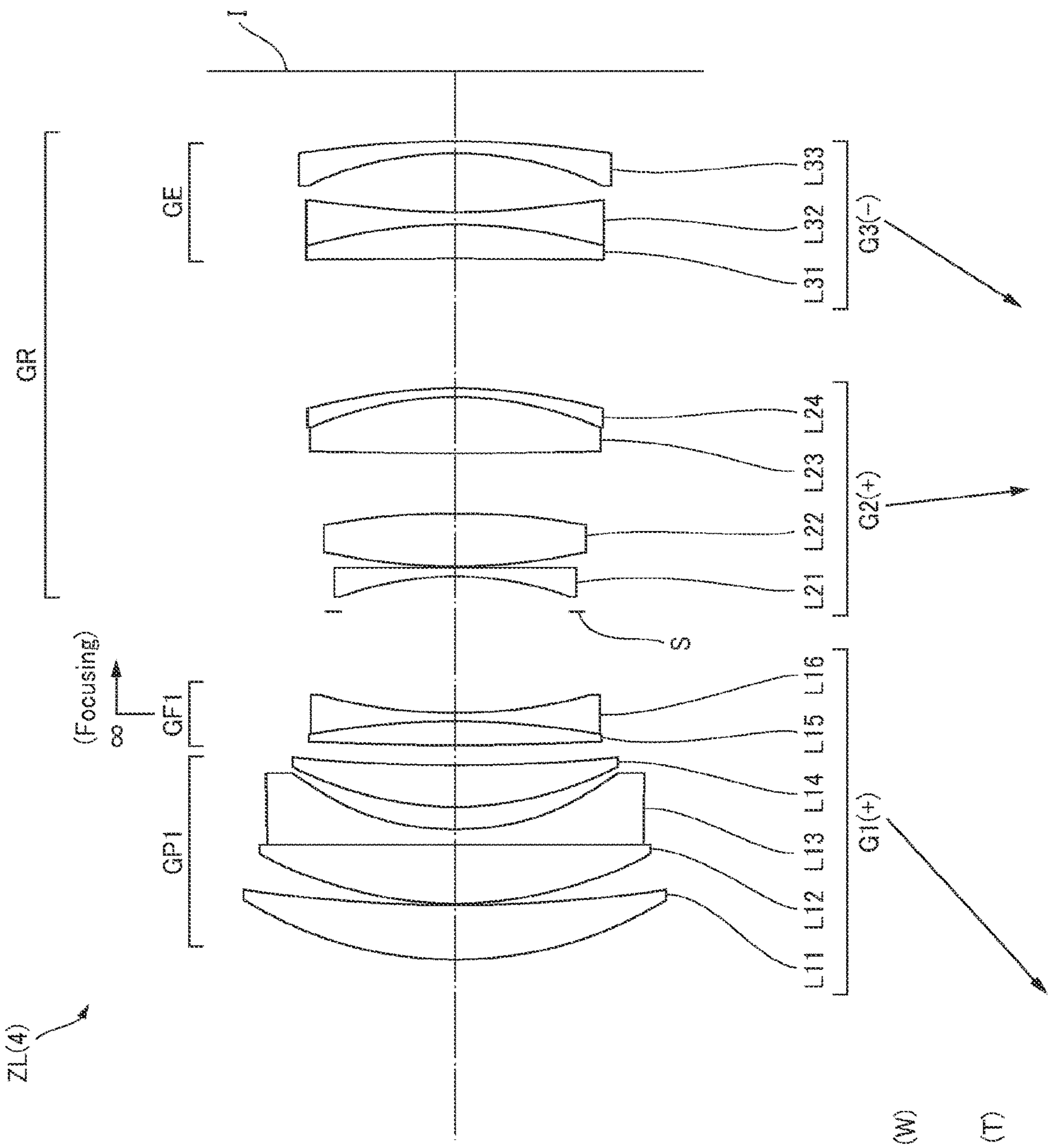
FIG. 7 is a diagram showing a lens configuration of a zoom optical system according to a fourth example.

The fourth example will be described below with reference to FIGS. 7 and 8 and Table 4. FIG. 7 is a diagram showing a lens configuration of the zoom optical system according to the fourth example. The zoom optical system ZL(4) according to the fourth example comprises a first lens group G1 having positive refractive power, an aperture stop S, a second lens group G2 having positive refractive power, and a third lens group G3 having negative refractive power, the lens groups being arranged in order from an object side along an optical axis. Upon zooming from a wide-angle end state (W) to a telephoto end state (T), the first lens group G1 and the third lens group G3 move to the object side along the optical axis, the second lens group G2 moves to the image side along the optical axis, and the space between the lens groups adjacent to each other changes. Upon zooming, the aperture stop S moves along the optical axis together with the first lens group G1.

The first lens group G1 comprises a positive meniscus lens L11 having a convex surface toward the object side, a cemented lens formed by cementing a positive meniscus lens L12 having a convex surface toward the object side and a negative meniscus lens L13 having a convex surface toward the object side, a positive meniscus lens L14 having a convex surface toward the object side, and a cemented lens formed by cementing a biconvex positive lens L15 and a biconcave negative lens L16, the lenses being arranged in order from the object side along the optical axis.

The second lens group G2 comprises a biconcave negative lens L21, a biconvex positive lens L22, and a cemented lens formed by cementing a biconvex positive lens L23 and a negative meniscus lens L24 having a concave surface toward the object side, the lenses being arranged in order from the object side along the optical axis. The positive lens L23 has an aspherical lens surface on the object side.

The third lens group G3 comprises a cemented lens formed by cementing a positive meniscus lens L31 having a concave surface toward the object side and a biconcave negative lens L32, and a negative meniscus lens L33 having a concave surface toward the object side, the lenses being arranged in order from the object side along the optical axis. The negative lens L32 has an aspherical surface lens on the image side. The image surface I is disposed on the image side of the third lens group G3.

In the present example, the second lens group G2 and the third lens group G3 serve as the rear group GR having positive refractive power as a whole. The third lens group G3 corresponds to the final lens group GE disposed closest to the image side in the rear group GR. The negative meniscus lens L33 in the third lens group G3 corresponds to the final lens. The positive meniscus lens L11, the cemented lens formed by cementing the positive meniscus lens L12 and the negative meniscus lens L13, and the positive meniscus lens L14 in the first lens group G1 serve as the front fixed group GP1 having a position fixed relative to the image surface I upon focusing. The cemented lens formed by cementing the positive lens L15 and the negative lens L16 in the first lens group G1 serves as the front focusing group GF1 that moves along the optical axis upon focusing. Upon focusing on from an infinite distance object to a close distance object, the front focusing group GF1 (cemented lens formed by cementing the positive lens L15 and the negative lens L16 in the first lens group G1) moves to the image side along the optical axis.

Table 4 below lists data values of the zoom optical system according to the fourth example.

TABLE 4

[General Data]

| | |
|---|---|
| Zooming ratio = 1.497 | |
| YLE = 18.000 | IHw = 21.600 |
| fP1 = 82.088 | fF1 = −96.051 |
| fRw = 118.327 | |

| | W | T |
|---|---|---|
| f | 87.500 | 131.000 |
| FNO | 1.860 | 2.785 |
| 2ω | 27.51 | 18.80 |
| Ymax | 21.600 | 21.600 |
| TL | 115.456 | 145.509 |
| Bf | 9.105 | 23.679 |

[Lens Data]

| Surface Number | R | D | nd | νd |
|---|---|---|---|---|
| 1 | 47.389 | 6.930 | 1.846660 | 23.8 |
| 2 | 168.915 | 0.200 | | |
| 3 | 46.629 | 7.713 | 1.593190 | 67.9 |
| 4 | 20954.696 | 2.000 | 1.846660 | 23.8 |
| 5 | 30.529 | 2.967 | | |
| 6 | 40.993 | 5.299 | 1.593190 | 67.9 |
| 7 | 183.696 | (D7) | | |
| 8 | 389.304 | 3.072 | 1.945944 | 18.0 |
| 9 | −93.280 | 1.100 | 1.850000 | 27.0 |
| 10 | 60.942 | (D10) | | |
| 11 | ∞ | (D11) | | (Aperture Stop S) |
| 12 | −40.799 | 1.100 | 1.720000 | 43.6 |
| 13 | 6130.299 | 0.200 | | |
| 14 | 65.875 | 6.929 | 1.696800 | 55.5 |
| 15 | −87.261 | 7.752 | | |
| 16* | 234.100 | 7.362 | 1.772500 | 49.6 |
| 17 | −40.329 | 1.100 | 1.846660 | 23.8 |
| 18 | −61.665 | (D18) | | |
| 19 | −723.265 | 4.425 | 1.846660 | 23.8 |
| 20 | −61.965 | 1.600 | 1.487490 | 70.3 |
| 21* | 82.427 | 7.649 | | |
| 22 | −40.118 | 1.600 | 1.834000 | 37.2 |
| 23 | −116.183 | Bf | | |

[Aspherical Surface Data]

16th Surface

κ = 1.0000, A4 = −4.01821E−06, A6 = 3.20252E−10, A8 = −3.12345E−12, A10 = 3.14559E−15

21st Surface

κ = 1.0000, A4 = −2.97715E−06, A6 = −3.92189E−09, A8 = 1.79480E−12, A10 = −9.46067E−15

TABLE 4-continued

| [Variable Distance Data] | | | |
|---|---|---|---|
| | W | M | T |
| Upon focusing on infinity | | | |
| Focal length | 87.500 | 105.000 | 131.000 |
| Distance | ∞ | ∞ | ∞ |
| D7 | 2.689 | 2.689 | 2.689 |
| D10 | 13.153 | 13.153 | 13.153 |
| D11 | 4.613 | 18.735 | 35.490 |
| D18 | 16.898 | 9.784 | 1.500 |
| Bf | 9.105 | 15.838 | 23.679 |
| Upon focusing on a very short distance object | | | |
| Magnification | −0.085 | −0.103 | −0.130 |
| Distance | 1084.544 | 1070.803 | 1054.491 |
| D7 | 11.156 | 11.275 | 11.422 |
| D10 | 4.686 | 4.566 | 4.420 |
| D11 | 4.613 | 18.735 | 35.490 |
| D18 | 16.898 | 9.784 | 1.500 |
| Bf | 9.105 | 15.838 | 23.679 |

| [Lens Group Data] | | |
|---|---|---|
| Group | First surface | Focal length |
| G1 | 1 | 187.387 |
| G2 | 12 | 59.720 |
| G3 | 19 | −67.423 |

Figure 8A:
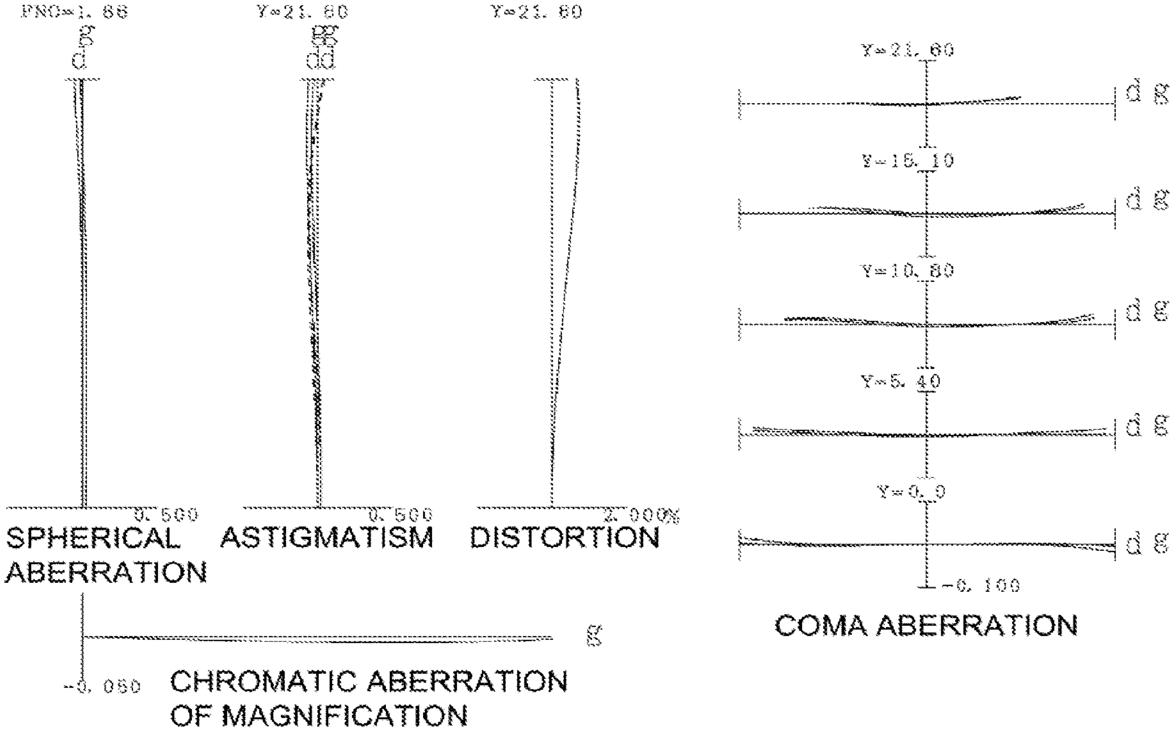
FIGS. 8A and 8B are a variety of aberration diagrams of the zoom optical system according to the fourth example upon focusing on infinity in a wide-angle end state and a telephoto end state, respectively.
Figure 8B:
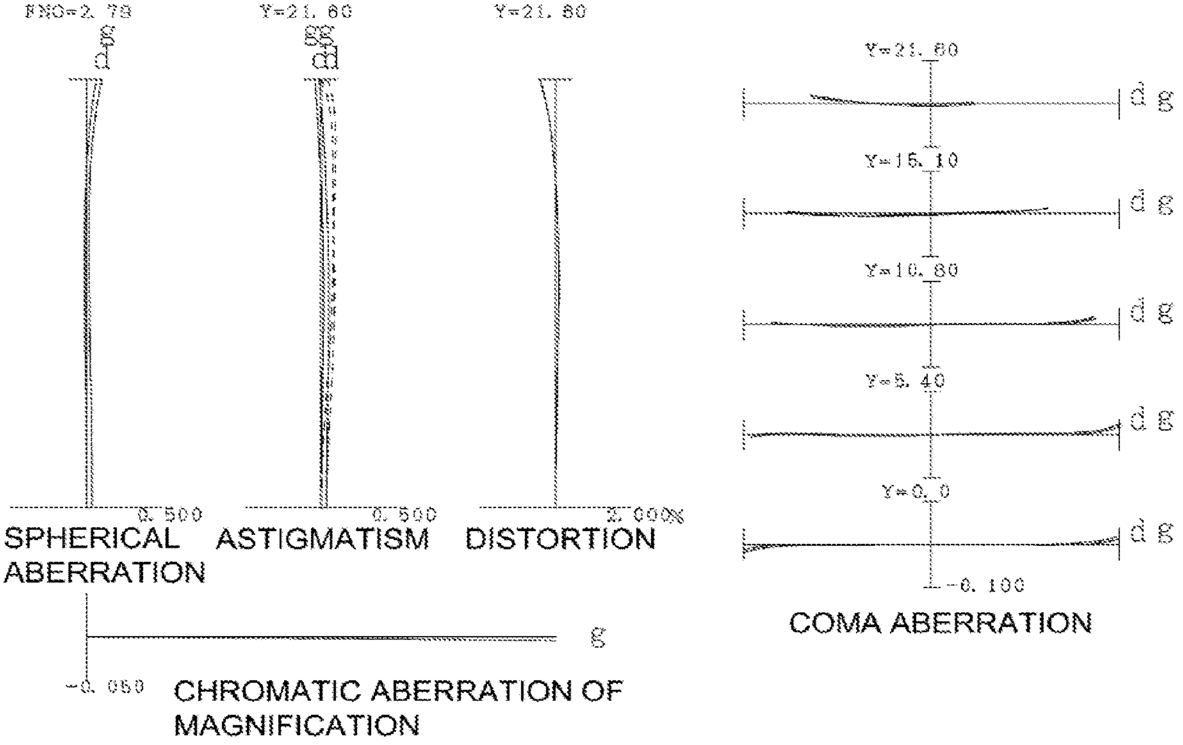

FIG. 8A is a variety of aberration diagrams of the zoom optical system according to the fourth example upon focusing on infinity in the wide-angle end state. FIG. 8B is a variety of aberration diagrams of the zoom optical system according to the fourth example upon focusing on infinity in the telephoto end state. From the variety of aberration diagrams, it can be understood that the zoom optical system according to the fourth example has a variety of aberrations excellently corrected in both the wide-angle end state and the telephoto end state and has excellent imaging performance.

The following presents a table of [Conditional expression correspondence value]. The table collectively lists values corresponding to Conditional Expressions (1) to (16) for all examples (first to fourth examples).

$0.15<f2/f1<0.80$ Conditional Expression (1)

$0.60<fP1/(-fF1)<1.00$ Conditional Expression (2)

$0.80<(-fF1)/fw<1.40$ Conditional Expression (3)

$1.20<ft/fw<2.00$ Conditional Expression (4)

$0.01<Bfw/TLw<0.20$ Conditional Expression (5)

$0.60<YLE/IHw<1.00$ Conditional Expression (6)

$FNOw<2.8$ Conditional Expression (7)

$10.00°<2\omega w<35.00°$ Conditional Expression (8)

$0.30<fw/f1<0.70$ Conditional Expression (9)

$0.30<f2/fRw<0.65$ Conditional Expression (10)

$0.50<-fGE)/fw<1.00$ Conditional Expression (11)

$1.00<(L1r2+L1r1)/(L1r2-L1r1)<2.50$ Conditional Expression (12)

$1.50<(LEr2+LEr1)/(LEr2-LEr1)<3.00$ Conditional Expression (13)

$1.00<f1/fRw<1.80$ Conditional Expression (14)

$-0.30<fF2/fF1<0.30$ Conditional Expression (15)

$0.01<fF2/(-fF1)<0.30$ Conditional Expression (16)

| [Conditional Expression Corresponding Value] (First~Fourth example) | | | | |
|---|---|---|---|---|
| Conditional Expression | First example | Second example | Third example | Fourth example |
| (1) | 0.318 | 0.317 | 0.379 | 0.319 |
| (2) | 0.831 | 0.838 | 0.825 | 0.855 |
| (3) | 1.155 | 1.134 | 1.030 | 1.098 |
| (4) | 1.497 | 1.499 | 1.497 | 1.497 |
| (5) | 0.076 | 0.079 | 0.080 | 0.079 |
| (6) | 0.833 | 0.833 | 0.833 | 0.833 |
| (7) | 1.859 | 1.859 | 1.858 | 1.860 |
| (8) | 27.50 | 27.48 | 27.43 | 27.51 |
| (9) | 0.469 | 0.470 | 0.535 | 0.467 |
| (10) | 0.495 | 0.495 | 0.420 | 0.505 |
| (11) | 0.756 | 0.759 | 0.740 | 0.771 |
| (12) | 1.784 | 1.755 | 1.433 | 1.780 |
| (13) | 2.278 | 2.278 | 2.021 | 2.055 |
| (14) | 1.556 | 1.562 | 1.109 | 1.584 |
| (15) | — | 0.148 | 0.031 | — |
| (16) | — | 0.148 | 0.031 | — |

Acct each above-described example, it is possible to achieve a zoom optical system having a small size and bright and favorable optical performance.

The above-described examples are specific examples of the present application invention, and the present application invention is not limited thereto.

Contents of the following description may be applied as appropriate without losing the optical performance of a zoom optical system of the present embodiment.

Each above-described example of the zoom optical system of the present embodiment has a three-group configuration or a four-group configuration, but the present application is not limited thereto and the zoom optical system may have any other group configuration (for example, a five-group). Specifically, a lens or a lens group may be added closest to the object side or the image surface side in the zoom optical system of the present embodiment. Note that a lens group means a part including at least one lens and separated at an air distance that changes upon zooming.

The focusing lens groups may perform focusing on from an infinite distance object to a close distance object by moving one or a plurality of lens groups or a partial lens group in the optical axis direction. The focusing lens groups are also applicable to automatic focusing and also suitable for automatic focusing motor drive (using an ultrasonic wave motor or the like).

A lens group or a partial lens group may be moved with a component in a direction orthogonal to the optical axis or may be rotationally moved (swung) in an in-plane direction including the optical axis, thereby achieving a vibration-proof lens group that corrects image blur caused by camera shake.

A lens surface may be so formed as to be a spherical surface, a flat surface, or an aspherical surface. In the case where a lens surface is a spherical or flat surface, the lens is readily processed, assembled, and adjusted, whereby degradation in the optical performance due to errors in the lens processing, assembly, and adjustment is preferably avoided. Further, even when an image plane is shifted, the amount of degradation in drawing performance is preferably small.

In the case where the lens surface is an aspherical surface, the aspherical surface may be any of a ground aspherical surface, a glass molded aspherical surface that is a glass surface so molded in a die as to have an aspheric shape, and a composite aspherical surface that is a glass surface on which aspherically shaped resin is formed. The lens surface may instead be a diffractive surface, or the lenses may be any of a distributed index lens (GRIN lens) or a plastic lens.

The aperture stop is preferably disposed between the first lens group and the second lens group, but no member as an aperture stop may be provided and the frame of a lens may serve as the aperture stop.

Each lens surface may be provided with an antireflection film having high transmittance over a wide wavelength range to achieve good optical performance that reduces flare and ghost and achieves high contrast.

EXPLANATION OF NUMERALS AND CHARACTERS

G1 first lens group
G2 second lens group
G3 third lens group
G4 fourth lens group
I image surface
S aperture stop

The invention claimed is:

1. A zoom optical system consisting of a first lens group having positive refractive power and a rear group comprising a plurality of lens groups, the lens groups being arranged in order from an object side along an optical axis, wherein a space between the lens groups adjacent to each other changes upon zooming, the plurality of lens groups in the rear group include a second lens group having positive refractive power and disposed closest to the object side in the rear group, and the following conditional expressions are satisfied:

$$0.15<f2/f1<0.80$$

$$0.30<f2/fRw<0.65$$

where f1: a focal length of the first lens group, f2: a focal length of the second lens group, and fRw: combined focal length of the rear group in a wide-angle end state.

2. The zoom optical system according to claim 1, wherein the following conditional expression is satisfied:

$$1.20<ft/fw<2.00$$

where ft: a focal length of the zoom optical system in a telephoto end state, and fw: a focal length of the zoom optical system in a wide-angle end state.

3. The zoom optical system according to claim 1, wherein the following conditional expression is satisfied:

$$0.01<Bfw/TLw<0.20$$

where

Bfw: a back focus of the zoom optical system in a wide-angle end state, and

TLw: an entire length of the zoom optical system in the wide-angle end state.

4. The zoom optical system according to claim 1, wherein the following conditional expression is satisfied:

$$0.60<YLE/IHw<1.00$$

where

YLE: an effective diameter of a lens disposed closest to an image side in the zoom optical system, and IHw: a maximum image height of the zoom optical system in a wide-angle end state.

5. The zoom optical system according to claim 1, wherein the following conditional expression is satisfied:

$$FNOw<2.8$$

where

FNOw: an F-number of the zoom optical system in a wide-angle end state.

6. The zoom optical system according to claim 1, wherein the following conditional expression is satisfied:

$$10.00°<2\omega w<35.00°$$

where

2ωw: a full angle of view of the zoom optical system in a wide-angle end state.

7. The zoom optical system according to claim 1, wherein the following conditional expression is satisfied:

$$0.30<fw/f1<0.70$$

where fw: a focal length of the zoom optical system in a wide-angle end state, and f1: the focal length of the first lens group.

8. The zoom optical system according to claim 1, wherein the plurality of lens groups in the rear group include a final lens group disposed closest to an image side in the rear group, and the following conditional expression is satisfied:

$$0.50<(-fGE)/fw<1.00$$

where fGE: a focal length of the final lens group, and fw: a focal length of the zoom optical system in a wide-angle end state.

9. The zoom optical system according to claim 1, wherein the following conditional expression is satisfied:

$$1.00<(L1r2+L1r1)/(L1r2-L1r1)<2.50$$

where

L1r1: a radius of curvature of a lens surface of a lens disposed closest to the object side in the zoom optical system, the lens surface being on the object side, and L1r2: a radius of curvature of a lens surface of the lens disposed closest to the object side in the zoom optical system, the lens surface being on an image side.

10. The zoom optical system according to claim 1, wherein the following conditional expression is satisfied:

$$1.50<(LEr2+LEr1)/(LEr2-LEr1)<3.00$$

where

LEr1: a radius of curvature of a lens surface of a lens disposed closest to an image side in the zoom optical system, the lens surface being on the object side, and LEr2: a radius of curvature of a lens surface of the lens disposed closest to the image side in the zoom optical system, the lens surface being on the image side.

11. The zoom optical system according to claim 1, wherein the following conditional expression is satisfied:

$$1.00<f1/fRw<1.80$$

where f1: the focal length of the first lens group, and fRw: a combined focal length of the rear group in a wide-angle end state.

12. The zoom optical system according to claim 1, wherein the plurality of lens groups in the rear group include a second lens group having positive refractive power and disposed closest to the object side in the rear group, and a third lens group disposed side by side on an image side of the second lens group, and a space between the second lens group and the third lens group decreases upon zooming from a wide-angle end state to a telephoto end state.

13. The zoom optical system according to claim 1, comprising an aperture stop disposed between the first lens group and the rear group, wherein the first lens group moves along the optical axis together with the aperture stop upon zooming.

14. The zoom optical system according to claim 1, wherein the first lens group comprises a front focusing group that moves along the optical axis upon focusing, the rear group comprises a rear focusing group that moves along the optical axis with a locus different from a locus of the front focusing group upon focusing, and at least part of any one of the plurality of lens groups in the rear group is included in the rear focusing group.

15. The zoom optical system according to claim 14, wherein the following conditional expression is satisfied:

$$-0.30<fF2/fF1<0.30$$

where fF1: a focal length of the front focusing group, and fF2: a focal length of the rear focusing group.

16. The zoom optical system according to claim 14, wherein the following conditional expression is satisfied:

$$0.01<fF2/(-fF1)<0.30$$

where fF1: a focal length of the front focusing group, and fF2: a focal length of the rear focusing group.

17. An optical apparatus comprising the zoom optical system according to claim 1.

18. A zoom optical system consisting of a first lens group having positive refractive power and a rear group comprising a plurality of lens groups, the lens groups being arranged in order from an object side along an optical axis, wherein upon zooming from a wide-angle end state to a telephoto end state, the first lens group moves to the object side along the optical axis and a space between the lens groups adjacent to each other changes, the first lens group comprises a front fixed group having a position fixed relative to an image surface upon focusing and a front focusing group that moves along the optical axis upon focusing, the groups being arranged in order from the object side along the optical axis, and the following conditional expressions are satisfied:

$$0.60<EP1/(-fF1)<1.00$$

$$0.80<(-fF1)/fw<1.40$$

where fP1: a focal length of the front fixed group, fF1: a focal length of the front focusing group, and fw: a focal length of the zoom optical system in the wide-angle end state.

19. A method for manufacturing a zoom optical system consisting of a first lens group having positive refractive power and a rear group comprising a plurality of lens groups, the lens groups being arranged in order from an object side along an optical axis, the method comprises one of the following steps (A), (B), or (C):

(A) arranging the lens groups in a lens barrel so that:

a space between the lens groups adjacent to each other changes upon zooming, the plurality of lens groups in the rear group include a second lens group having positive refractive power and disposed closest to the object side in the rear group, and the following conditional expressions are satisfied:

$$0.15<f2/f1<0.80$$

$$0.30<f2/fRw<0.65$$

where f1: a focal length of the first lens group, f2: a focal length of the second lens group, and fRw: combined focal length of the rear group in a wide-angle end state, (B) arranging the lens groups in a lens barrel so that:

upon zooming from a wide-angle end state to a telephoto end state, the first lens group moves to the object side along the optical axis and a space between the lens groups adjacent to each other changes, the first lens group comprises a front fixed group having a position fixed relative to an image surface upon focusing and a front focusing group that moves along the optical axis upon focusing, the groups being arranged in order from the object side along the optical axis, and the following conditional expressions are satisfied:

$$0.60<fP1/(-fF1)<1.00$$

$$0.80<(-fF1)/fw<1.40$$

where f1: a focal length of the front fixed group, fF1: a focal length of the front focusing group, and fw: a focal length of the zoom optical system in the wide-angle end state, and (C) arranging the lens groups in a lens barrel so that:

a space between the lens groups adjacent to each other changes upon zooming, the plurality of lens groups in the rear group include a second lens group having positive refractive power and disposed closest to the object side in the rear group, the plurality of lens groups in the rear group include a final lens group disposed closest to an image side in the rear group, and the following conditional expressions are satisfied:

$$0.15<f2/f1<0.80$$

$$0.50<(-fGE)/fw<1.00$$

where f1: a focal length of the first lens group, f2: a focal length of the second lens group, fGE: a focal length of the final lens group, and fw: a focal length of the zoom optical system in a wide-angle end state.

20. A zoom optical system consisting of a first lens group having positive refractive power and a rear group comprising a plurality of lens groups, the lens groups being arranged in order from an object side along an optical axis, wherein a space between the lens groups adjacent to each other changes upon zooming, the plurality of lens groups in the rear group include a second lens group having positive refractive power and disposed closest to the object side in the rear group, the plurality of lens groups in the rear group include a final lens group disposed closest to an image side in the rear group, and the following conditional expressions are satisfied:

$$0.15 < f2/f1 < 0.80$$

$$0.50 < (-fGE)/fw < 1.00$$

where f1: a focal length of the first lens group, f2: a focal length of the second lens group, fGE: a focal length of the final lens group, and fw: a focal length of the zoom optical system in a wide-angle end state.

* * * * *